United States Patent
Fellmann et al.

(10) Patent No.: US 11,969,911 B2
(45) Date of Patent: *Apr. 30, 2024

(54) TOOL DEVICE FOR A HAND-HELD POWER TOOL

(71) Applicant: Robert Bosch GmbH, Stuttgart (DE)

(72) Inventors: Willi Fellmann, Solothurn (CH);
Bruno Luescher, Vordemwald (CH);
Andreas Zurbruegg,
Lohn-Ammansegg (CH); Aldo Di Nicolantonio, Rüttenen (CH); Bruno Sinzig, Oberbipp (CH); Laurent Quebatte, Visp (CH); Marcus Schuller, Dettenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 233 days.

This patent is subject to a terminal disclaimer.

(21) Appl. No.: 17/173,768

(22) Filed: Feb. 11, 2021

(65) Prior Publication Data
US 2021/0221021 A1 Jul. 22, 2021

Related U.S. Application Data

(63) Continuation of application No. 16/326,109, filed as application No. PCT/EP2017/070310 on Aug. 10, 2017, now Pat. No. 11,052,564.

(30) Foreign Application Priority Data

Aug. 22, 2016 (DE) ...................... 10 2016 215 702.7
Jan. 31, 2017 (DE) ...................... 10 2017 201 501.2
Aug. 7, 2017 (DE) ...................... 10 2017 213 669.3

(51) Int. Cl.
*B27B 5/32* (2006.01)
*B23B 51/04* (2006.01)
(Continued)

(52) U.S. Cl.
CPC ............ *B27B 5/32* (2013.01); *B23B 51/0473* (2013.01); *B23D 61/025* (2013.01); *B24B 45/00* (2013.01); *B24B 45/006* (2013.01); *B24D 5/16* (2013.01)

(58) Field of Classification Search
CPC ........... B27B 5/32; B27B 19/006; B27B 5/30; B23B 51/0473; B23D 61/025; B24B 45/00; B24B 45/006
See application file for complete search history.

(56) References Cited

U.S. PATENT DOCUMENTS 4,657,428 A 4/1987 Wiley
5,799,558 A 9/1998 Hewitt et al.
(Continued)

FOREIGN PATENT DOCUMENTS

CA 1015246 A 8/1977
CA 2290178 A1 * 9/2000 ........... B23D 61/025
(Continued)

OTHER PUBLICATIONS

International Search Report corresponding to PCT Application No. PCT/EP2017/070310, dated Nov. 14, 2017 (German and English language document) (8 pages).

*Primary Examiner* — Eric A. Gates
(74) *Attorney, Agent, or Firm* — Maginot, Moore & Beck LLP

(57) ABSTRACT

A tool device for a hand-held power tool, which can be operated such that the tool device is rotated about an output shaft of a tool-holding device, has at least one connecting device, which is detachably connected to an output shaft of the power tool. The connecting device is fastened to the tool-holding device so that a drive axis of the output shaft and a tool axis of rotation substantially coincide. The connecting device has a cut-out and at least one clamping wing, which at least partly bounds the cut-out in the radial (Continued)

direction of the tool axis of rotation and which is bounded substantially in the direction radial to the tool axis of rotation by a first bounding edge, which lies on a first bounding circle around the tool axis of rotation. The clamping wing extends at least substantially along a plane orthogonal to the tool axis of rotation.

24 Claims, 19 Drawing Sheets

(51) Int. Cl.
  *B23D 61/02* (2006.01)
  *B24B 45/00* (2006.01)
  *B24D 5/16* (2006.01)

(56) References Cited

U.S. PATENT DOCUMENTS

| | | | | |
|---|---|---|---|---|
| 6,004,194 | A | * | 12/1999 | Hild ................. B24B 45/006 451/344 |
| 6,035,758 | A | | 3/2000 | Taylor et al. |
| 6,116,996 | A | | 9/2000 | Yanase |
| 6,321,627 | B1 | * | 11/2001 | Taylor ................. B23D 61/025 83/676 |
| 10,828,742 | B2 | | 11/2020 | Luescher et al. |
| 11,052,564 | B2 | * | 7/2021 | Fellmann ............. B24B 45/006 |
| 2005/0085174 | A1 | | 4/2005 | Yanase |
| 2007/0018413 | A1 | | 1/2007 | Allemann et al. |
| 2007/0167119 | A1 | | 7/2007 | Momosaki |
| 2007/0293380 | A1 | * | 12/2007 | Kausch ................. B24B 45/006 483/1 |
| 2016/0229028 | A1 | * | 8/2016 | Thijs ................. B24B 23/02 |

FOREIGN PATENT DOCUMENTS

| | | | | |
|---|---|---|---|---|
| CN | 101535000 | A | | 9/2009 |
| DE | 296 05 728 | U1 | | 9/1996 |
| DE | 10211371 | A1 | * | 9/2003 ........... B24B 45/006 |
| DE | 698 19 647 | T2 | | 9/2004 |
| DE | 102010031342 | A1 | * | 4/2011 ........... B24B 45/006 |
| DE | 102012201624 | A1 | | 8/2013 |
| DE | 202016102081 | U1 | * | 6/2016 |
| EP | 0 904 896 | A2 | | 3/1999 |
| EP | 1 586 418 | A1 | | 10/2005 |
| EP | 1 745 889 | A1 | | 1/2007 |
| EP | 3 500 401 | B1 | | 4/2022 |
| GB | 2 336 991 | A | | 11/1999 |
| GB | 2390316 | A | * | 1/2004 ........... B24B 23/028 |
| GB | 2462917 | A | * | 3/2010 ......... B24D 18/0009 |
| JP | H10-277955 | A | | 10/1998 |
| JP | H11-099460 | A | | 4/1999 |
| SU | 908580 | A1 | | 2/1982 |
| WO | 2004/045805 | A1 | | 6/2004 |
| WO | 2013/113523 | A1 | | 8/2013 |
| WO | 2018/036830 | A1 | | 1/2018 |

* cited by examiner

TOOL DEVICE FOR A HAND-HELD POWER TOOL

This application is a continuation application of copending U.S. patent application Ser. No. 16/326,109, filed on Feb. 15, 2019, which is a 35 U.S.C. § 371 National Stage Application of PCT/EP2017/070310, filed on Aug. 10, 2017, which claims the benefit of priority to Serial Nos. DE 10 2016 215 702.7, filed on Aug. 22, 2016; DE 10 2017 201 501.2 filed on Jan. 31, 2017 and DE 10 2017 213 669.3 filed on Aug. 7, 2017 all in Germany, the disclosures of all of which are incorporated herein by reference in their entirety.

The disclosure relates to a tool device, in particular for machining a workpiece, for receiving in a hand-held power tool that is capable of rotatably driving the tool device about an output shaft of a tool receptacle device, having at least one connector device which is capable of being releasably connected to an output shaft of the hand-held power tool, wherein the connector device is capable of being fastened to the tool receptacle device in such a manner that an output axis of the output shaft and a tool rotation axis of the tool device substantially coincide, wherein the connector device has a clearance.

BACKGROUND

A cutting blade comprising a saw blade said cutting blade having a central fastening opening for fastening in a form-fitting manner to an output shaft which in an oscillating manner is driven about the longitudinal axis of the latter, wherein the cutting blade is configured so as to be circular, is disclosed in DE 29605728 U1.

SUMMARY

The disclosure is based on the object of improving a tool device for a power tool, in particular a hand-held power tool, using simple constructive measures.

The object is achieved by a tool device, in particular for machining a workpiece, for receiving in a hand-held power tool that is capable of rotatably driving the tool device about an output shaft of a tool receptacle device, having at least one connector device which is capable of being releasably connected to an output shaft of the hand-held power tool, wherein the connector device is capable of being fastened to the tool receptacle device in such a manner that an output axis of the output shaft and a tool rotation axis of the tool device substantially coincide, wherein the connector device has a clearance.

According to the disclosure, the connector device has at least one clamping wing which in the radial direction of the tool rotation axis at least partially delimits the clearance and which in the radial direction to the tool rotation axis is substantially delimited by a first delimitation edge which lies on a first, in particular minimum, delimitation circle about the tool rotation axis, wherein the clamping wing extends at least substantially along an orthogonal plane to the tool rotation axis.

The disclosure will be described hereunder predominantly by way of the example of a tool device, in particular for use with an in particular hand-guided power tool, in particular with a hand-held power tool, which has a tool receptacle device that rotationally moves about an output axis. However, this limitation in terms of the illustration is not to be understood as a limitation of the potential applications of such a tool device.

A power tool, in particular a hand-held power tool, is an apparatus which has one or a plurality of drive motors and optionally one or a plurality of gear devices as well as at least one output shaft having an output axis, the latter to be understood in the geometric sense. The tool receptacle device is disposed indirectly or directly on the output shaft. The tool receptacle device is the component, or are the components, respectively, by way of which the torque is applied to the tool, in particular the tool device, wherein the tool receptacle device, in particular in the case of a hand-guided power tool, in particular a hand-held power tool, also preferably fixedly holds the tool such that the tool, in particular the tool device, solely by way of the tool receptacle device is fixedly held as well as impinged with the output torque. The term output torque and the terms formed with output mean that the momentum that is transmitted from the power tool, in particular from the hand-held power tool, to the tool, in particular to the tool device, or the corresponding components of the power tool, in particular of the hand-held power tool, respectively; the term drive torque refers to the momentum received by the tool, in particular by the tool device.

A hand-guided power tool, in particular hand-held power tool, has a carrying device, in particular handles and the like, by way of which the power tool, in particular the hand-held power tool, conjointly with the tool fastened thereto, in particular the tool device fastened thereto, can be guided by an operator. Hand-guided power tools, in particular hand-held power tools, are typically provided with an electric drive motor; however, other construction types such as, for example, power tools, in particular hand-held power tools, that are operated by means of an internal combustion engine, or operated hydraulically or pneumatically, are also known and capable of being used in the context of the disclosure.

The power tool, in particular the hand-held power tool, enables tool devices, in particular for fast-rotating applications, to be received or chucked, respectively, in a tool-free manner such that no additional, in particular removable, securing element such as, for example a fastening screw, is preferably required for fastening the tool device to the tool receptacle device. The power tool, in particular the hand-held power tool, is provided for connecting or chucking, respectively, a tool device to the tool receptacle device in a particularly rapid and comfortable manner, such that an operator in the case of a power tool of this type can perform a particularly rapid tool changeover. On account thereof, the use of an additional tool, such as a spanner or a screwdriver, for example, is also no longer required in order for the tool device to be connected to the power tool.

The tool device according to the disclosure is particularly advantageous since the at least one clamping wing is designed in such a manner that the tool device is capable of being operated with the hand-held power tool in a vibration-minimizing manner, such that the at least one clamping wing that extends in the radial direction not only effects a particularly advantageous transmission of the torque from the output shaft of the tool receptacle device to the tool device, but also enables a particularly vibration-minimizing operation of the tool device in a state chucked to the tool receptacle device. On account thereof, vibrations that are created in the operation of the tool device can be better absorbed, which can be amplified along with increasing pretensioning in the clamped state.

The connector device is provided to be releasably connected to conventional commercially available power tools, in particular hand-held power tools, such that a backward compatibility of the tool device is guaranteed. The backward compatibility herein is achieved in particular in that the first delimitation edges of the clamping wing lie on a first delimitation circle which corresponds to a minimum diameter of conventional commercially available tool devices, such that centering the tool device on conventional tool receptacle devices is enabled.

"Releasable" in this context is in particular to be understood as "separable in a non-destructive manner".

The first delimitation edge can at least in portions delimit the clearance of the tool device. In particular the at least one clamping wing can at least in portions delimit the clearance of the tool device.

The tool device can extend substantially in a plane orthogonally to the tool rotation axis.

The clearance can in particular be provided for at least partially, in particular completely, surrounding the tool receptacle device of the hand-held power tool.

"Surrounding" in this context is in particular to be understood to be surrounded in at least one plane such as, an orthogonal plane of the tool rotation axis or the output axis, for example, by 360° about an output shaft, in particular about a tool receptacle device, preferably about a clamping device and an entrainment device of the tool receptacle, of the power tool, in particular of the hand-held power tool.

"Provided" is to be in particular understood as specially programmed, conceived, and/or equipped. An object to be provided for a specific function is in particular to be understood that the object fulfills and/or carries out said specific function in at least one application state and/or operating state.

An "orthogonal plane" in this context is to be understood to be a plane which is defined by at least two directions that point orthogonally to the tool rotation axis. Minor deviations herein such as, for example, an angular deviation of up to 5%, in particular up to 4%, preferably up to 3%, more preferably up to 2%, particularly more preferably up to 1%, from the directions which define the orthogonal plane are to be within the context of technical expertise and skill of a person skilled in the art.

The term "output axis" and "tool rotation axis" herein refers to the fictitious geometric rotation axis of the power tool, in particular of the output shaft of the hand-held power tool, or of the tool device, respectively.

The clamping wing can preferably have a radial form-fitting element which is in particular provided for forming a form-fitting connection for driving the tool device in the circumferential direction about the tool rotation axis of the tool device. The clamping wing herein can be embodied as a radial appendage or as a radial tongue.

In particular, the clearance, in particular a clearance contour of the clearance, can have an n-fold, in particular a 2-fold, preferably a 4-fold, more preferably a 6-fold, rotational symmetry, wherein n is a natural number from two to infinite.

A "rotational symmetry" in this context is to be understood to be a symmetry of a clearance contour of a clearance of a tool device which, in particular in the event of a relative rotation of the tool device by 360° about a center, or about a tool rotation axis of the tool device, respectively, in relation to a stationary copy of the tool device is depicted in a superimposed manner, or is congruent, n times. The number n herein is to be a natural number in a range from two to infinite.

Expedient refinements of the tool device according to the disclosure are set forth herein.

It can be expedient for the clamping wing to be configured as a spring wing. The clamping wing can be provided for connecting the tool device to the tool receptacle device in such a manner that the tool device receives stresses in the axial direction of the tool rotation axis at least in part by way of an elastic deformation, or an elastic flexing, respectively. The clamping wing preferably has a maximum benchmark D that corresponds to a spring rate of less than 400,000 N/mm. The clamping wing preferably has a maximum benchmark D that corresponds to a spring rate having a value from a value range from 10,000 N/mm to 350,000 N/mm. The maximum benchmark D of the clamping wing that corresponds to a spring rate preferably results from the following correlation:

F=Dz, wherein $$D = \frac{3EI}{L^S}, Z = \frac{EL^S}{3EI}, I = \frac{bh^3}{12},$$

where L is the, in particular mean, maximum extent of the clamping wing between the first delimitation circle and the second delimitation circle, where b is the maximum tangential extent of the clamping wing along the second delimitation circle, and where h is the maximum material thickness of the clamping wing along the axial direction of the tool rotation axis a. The maximum material thickness h can preferably correspond to a value from a value range from 0.5 mm to 1.6 mm. On account thereof, the tool receptacle device can reliably fasten the clamping wing in that the clamping wing at least in portions in the axial direction of the tool rotation axis is chucked in such a manner that the clamping wing is embodied so as to be elastically flexural in the axial direction.

It can be expedient for the clamping wing to be asymmetrical, in particular not mirror-symmetrical, in relation to each plane of symmetry defined by a radial and an axial direction of the tool rotation axis.

"Each plane of symmetry" in this context is to be understood to be each plane of symmetry which results from each radial direction that in relation to the tool rotation axis forms a radial axis in an angular range by up to 30°, in particular by up to 60°, preferably by up to 90°, more preferably by up to 120°, furthermore preferably by up to 180°, particular preferably by up to 360° in the circumferential direction about the tool rotation axis.

On account thereof, a multi-lateral collectability of the tool device to the tool receptacle device can in particular be avoided, such that the tool device is connected to the tool receptacle device only from a receptacle side that is provided for being received by the tool receptacle device. On account thereof, an immediate error detection and/or error avoidance according to the poka-yoke principle can be achieved, in that an operator obtains feedback when the tool device is connected to the tool receptacle device by way of a side that is not provided for being received by the tool receptacle device.

The tool device is particularly advantageous since the at least one clamping wing is designed in such a manner that the tool device is capable of being operated in a vibration-minimizing manner by the hand-held power tool, such that an asymmetrical embodiment of the at least one clamping wing not only effects a particularly advantageous transmission of the torque from the output shaft of the tool receptacle device to the tool device, but also makes possible a particularly vibration-minimizing operation of the tool device in a state chucked to the tool receptacle device. On account thereof, vibrations that are created in the operation of the tool device can be better damped and be amplified along with increasing pretensioning in the clamped state.

Furthermore, a rotation direction of the tool device about the tool rotation axis can be established by the asymmetrical embodiment of the at least one clamping wing, on account of which it can be ensured that the tool device is specially designed for machining a workpiece or a workpiece assembly only in a single rotation direction.

It can furthermore be expedient for a cross section of the clamping wing which results by way of an orthogonal plane of the tool rotation axis to be configured so as to be substantially trapezoidal, in particular to be configured so as to be substantially rectangular. The cross section can preferably be configured so as to be conical or truncated-cone-shaped.

It can be expedient for the first delimitation circle to have at least one fictitious projection edge which lies between two adjacent first delimitation edges and which lies on the first delimitation circle and in the circumferential direction about the tool rotation axis runs so as to be concentric with the first delimitation circle.

The extent in the circumferential direction of at least one, in particular of each, projection edge can be smaller than the extent of a first delimitation edge that is adjacent to the projection edge in particular by up to 50%, preferably by up to 40%, further preferably by up to 30%, more preferably by up to 20%, particularly more preferably by up to 10%, furthermore preferably by up to 5%.

The first delimitation edge can circumscribe an in particular maximum extent of a clamping wing in the circumferential direction along the first delimitation edge. The first delimitation edge can be provided for enabling centering, in particular rough centering or preliminary centering, respectively, of the tool device to a tool receptacle apparatus in a state that is to connect the tool device to the tool receptacle apparatus.

The at least one, in particular each, projection edge has a maximum extent in the circumferential direction that is smaller than a maximum radial extent of the tool receptacle device, in particular of a clamping device in the case of tool-free tool receptacle devices, or of a threaded bolt in the case of conventional tool receptacle devices, such that the tool device which in the radial direction surrounds the tool receptacle device can be pre-centered.

A total extent in the circumferential direction of all first delimitation edges that lie on the first delimitation circle is preferably larger, in particular by up to 100%, in particular by up to 80%, preferably by up to 60%, more preferably by up to 40%, particularly more preferably by up to 20%, furthermore preferably by up to 10%, larger than a total extent in the circumferential direction of all projection edges that lie on the first delimitation circle. Preferably, a, in particular each, projection edge is smaller than a first delimitation edge that is adjacent to the projection edge.

The connector device in the simplest case can be configured as a clearance such that the entrainment device and the clamping device can engage in or through the clearance. At least the entrainment device and/or the clamping device of the tool receptacle device in a state disposed on the tool receptacle device preferably engage/engages at least in part in the clearance of the connector device of the tool device. The entrainment device, in particular in a state of the tool device disposed on the tool receptacle device, is preferably provided for at least in part bearing on a peripheral region of the tool device that delimits the clearance of the connector device of the tool device.

Alternatively it can be expedient for the connector device to be formed by an in particular disk-shaped or angulated support flange. The connector device on account thereof can be embodied in a particularly stable manner in that the support flange comprises or is composed of a metallic material such as, for example, a steel material. The support flange can thus be connected to the tool receptacle device of the power tool, in particular of the hand-held power tool, in a particularly advantageously robust manner and be reliably held by the tool receptacle device. Moreover, the support flange permits the use of less material since the support flange can be embodied so as to be thin and nevertheless withstands the requirements set for the tool device.

The angulated support flange is provided for being received by a clamping device of the tool receptacle device, on account of which a particularly fast and comfortable receptacle of the tool device is guaranteed. The angulated support flange can preferably be provided for being particularly effectively connected to the conventional power tools, in particular hand-held power tools, in that the tool device is fixed by means of a clamping nut. The clamping nut can be accommodated in a hollow volume of the angulated support flange, on account of which the support flange at least in portions surrounds the clamping nut by 360° in at least one plane.

It can furthermore be expedient for the clamping wing by way of a second delimitation edge which lies on a second, in particular maximum, delimitation circle about the tool rotation axis to be delimited substantially in the radial direction to the tool rotation axis. The second delimitation edge can delimit the clearance of the connector device. On account thereof, the tool device can be centered in a particularly advantageous manner in that the clamping wings are destressed in the radial direction. A comparatively high moment of tilt can be supported by means of an enlarged radial spacing of the second delimitation edge in relation to the first delimitation edge, such that the tool device is held by the tool receptacle device in a particularly reliable manner.

It can furthermore be expedient for the tool device to have an operating region which is connected to the support flange and completely surrounds the support flange and which is specified for acting on a workpiece or a workpiece assembly. On account thereof, a separation of the functions can be achieved in a particularly simple manner in that the support flange establishes a stable connection to the tool receptacle device of the power tool, and the operating region has a necessary resilience or even rigidity that is adapted to a workpiece to be machined or to a workpiece assembly to be machined, for example, without herein weakening the connection of the tool device to the tool receptacle device for example. The support flange is preferably connected to the operating region by means of a materially integral, form-fitting and/or force-fitting connection, in particular is configured so as to be integral to the operating region.

It can furthermore be expedient for the operating region to be disposed on the support flange in such a manner that the operating region in a fastening state in relation to the support flange in the axial direction of the tool rotation axis projects in particular by up to 2 mm, preferably up to 1 mm, furthermore preferably up to 0.7 mm, more preferably up to 0.6 mm, particularly more preferably up to 0.3 mm, furthermore particularly preferably up to 0.1 mm in a direction oriented toward the tool receptacle device of the hand-held power tool. On account thereof, the tool device can be additionally supported on the tool receptacle device and enlargen an effective support radius of the tool device, on account of which an additional force-fitting connection of the tool device to the power tool is effected.

The tool device, in particular the operating region, can be embodied as a grinding disk and/or a cutting disk and/or a rough grinding disk, which serves in particular for the abrasive removal.

The tool receptacle device of the power tool, in particular of the hand-held power tool, in an outward manner can be either adjoined directly by the operating region or alternatively initially by a support flange that is disposed between the tool receptacle device and the operating region.

The maximum diameter of the support flange can be approximately 20% to 80%, in particular 30% to 70%, preferably 35% to 60%, of the maximum diameter of the tool device.

It is proposed that the tool device in the region of the support flange has at least one first upper support plane and at least one second lower support plane, wherein said support planes are disposed so as to be substantially perpendicular to the tool rotation axis, wherein said support planes are mutually spaced apart by the spacing T, and wherein said support planes delimit an axial extent of the support flange. The first support plane can be spaced apart from the second support plane at a spacing T of up to 25 mm, in particular up to 20 mm, preferably up to 15 mm, furthermore preferably up to 10 mm, more preferably up to 8 mm, particularly more preferably up to 5 mm, but also up to 3 mm, in particular up to 2 mm, preferably up to 1 mm. A particularly flat and stable embodiment of the tool device can be achieved on account thereof.

The support flange can have a substantially cylindrical sidewall which extends in the axial direction of the tool rotation axis and in particular delimits the operating region in the radial direction to the tool rotation axis. The sidewall can in particular have a substantially circular cross section.

Additionally, the tool receptacle device of the power tool, in particular of the hand-held power tool, can be protected from colliding with a workpiece by way of a pot-shaped support flange, for example. The sidewall can preferably be substantially concentric with the first delimitation circle and the second delimitation circle. The sidewall preferably extends between the first upper support plane and the second lower support plane. The sidewall can be provided for receiving at least part of the tool receptacle device in an internal region of the sidewall.

In one preferred embodiment the sidewall can encircle the tool rotation axis in a substantially radially closed manner. In one further embodiment the sidewall in the profile thereof about the tool rotation axis can have clearances or interruptions, respectively. A particularly stable connector device is achievable in particular by way of a closed encircling sidewall; a particularly lightweight connector device having a minor moment of inertia is in particular achievable by way of an interrupted sidewall or a sidewall having clearances.

The second support plane can be more remote from a power tool, in particular hand-held power tool, that receives the tool device than the first support plane, in particular in a state of the tool device disposed and/or fastened to the tool receptacle device.

It is furthermore proposed that the at least one clamping wing has a torque-receiving region, the latter in particular forming a drive edge and/or a drive face, for receiving a torque in the circumferential direction about the tool rotation axis, wherein the torque-receiving region at least in portions results from an axial and/or radial extent of the clamping wing. The torque-receiving region can be in contact with the tool receptacle device of the power tool by means of a punctiform bearing, in particular by means of a linear bearing, preferably by means of a planar bearing.

The torque-receiving region can in particular be disposed between the first lower support plane and the first upper support plane. The torque-receiving regions by way of in each case one drive edge and/or one drive face are preferably disposed so as to be mutually spaced apart along a circumferential direction that runs about the tool rotation axis, wherein in particular a minimum spacing between the torque-receiving regions, in particular between the drive edges and/or the drive faces of the torque-receiving regions, along the circumferential direction is in particular larger than 10%, preferably is larger than 20%, and particularly preferably is smaller than 60% of a total circumference of the first delimitation circle.

The torque-receiving region is provided for transmitting the drive torque of the power tool, in particular of the hand-held power tool, to a tool device.

The torque-receiving region, in particular the drive edge and/or the drive face, can in particular be angled counter to a rotation direction of the tool receptacle device in the operation of the power tool, in particular of the hand-held power tool, and in the circumferential direction about the tool rotation axis can preferably be angled in particular by up to 50°, preferably by up to 40°, more preferably by up to 30°, particularly preferably by up to 25°, in relation to a plane that is defined by an axial direction and a radial direction of the tool rotation axis. The drive face and/or the drive edge, in particular in a plane that runs at least substantially perpendicularly to the drive axis, preferably enclose an angle of in particular less than 80°, preferably of less than 60°, and particularly preferably of less than 45° in relation to a straight line that intersects the drive axis as well as the drive face and/or the drive edge at least in one point in particular in relation to the radical direction. The drive faces are preferably inclined relative to a circumferential direction that runs about the tool rotation axis. The drive faces in relation to the circumferential direction in each case enclose in particular an angle that is different from 90°.

The connector device can preferably have at least two clamping wings having in each case one torque-receiving region, in particular one drive edge and/or one drive face, which are disposed so as to be mutually parallel and spaced apart, and in particular that the two torque-receiving regions are symmetrical about the tool rotation axis.

It is furthermore proposed that the tool device has an operating region for machining a workpiece, said operating region being in particular connected in a materially integral and/or form-fitting manner to the support flange. A particularly advantageous separation of the functions can be achieved on account thereof. The form-fitting connection can be achieved in particular by way of a plurality of axial shaped features of the support flange which engage in the operating region and connect the support flange to the operating region in a form-fitting manner. The axial shaped features can be embodied in the form of protrusions or cams that project in the axial direction. The axial shaped features can be provided for improving a dissipation of heat.

It can be expedient for the support flange to delimit the clearance in the radial direction to the tool rotation axis. It can furthermore be expedient for the at least one clamping wing, in particular the clamping wing that is configured as a spring arm, to delimit the clearance at least in portions in a manner radial to the tool rotation axis. It can furthermore be expedient for the clearance to be configured as a material cut-out that extends through the entire material thickness of the tool device, in particular of the connector device, wherein the material cut-out is provided for completely encompassing the output shaft, in particular the tool receptacle device, preferably an entrainment device and a clamping device, of the hand-held power tool. A particularly stable connector device of the tool device is provided on account thereof.

"Connected in a materially integral manner" is in particular to be understood to be that the mass parts are held together by atomic or molecular forces such as is the case, for example, in soldering/brazing, welding, adhesive bonding and/or vulcanizing.

The material thickness t of the connector device is preferably selected from a defined range, wherein said material thickness is preferably larger than or equal to 0.2 mm, preferably larger than 0.5 mm, and particularly preferably larger than 0.8 mm; the material thickness t is furthermore preferably smaller than or equal to 4 mm, preferably smaller than 2 mm, and particularly preferably smaller than 1.5 mm. The material thickness t is particularly preferably substantially 1 mm or 1.5 mm, or preferably also a size between 1 mm and 1.5 mm. The achievement of a tool device which has a lightweight and thus a low moment of inertia, on the one hand, and a sufficiently stable tool device, on the another hand is in particular enabled by the choice of a suitable material thickness t from the afore-mentioned range.

It can furthermore be expedient for a diameter D1 of the first delimitation circle in relation to a diameter D2 of the second delimitation circle to have a ratio in a range from 50% to 95%, in particular in a range from 60% to 90%, preferably in a range from 65% to 85%, more preferably in a range from 70% to 80%. The first delimitation circle can in particular have a diameter D1 of approximately 22 mm such as, for example, 22.2 mm. The second delimitation circle can preferably have a diameter D2 of approximately 29 mm. The diameter D2 of the second delimitation circle in relation to the diameter D1 of the first delimitation circle can preferably have a ratio of 77%. A receptacle of the tool device on a multiplicity of conventional power tools, in particular hand-held power tools, can be enabled on account thereof.

The first delimitation circle can furthermore preferably have a diameter D1 of approximately 16 mm, and the second delimitation circle can have a diameter D2 in a range from approximately 21 mm to 22.5 mm, such that the tool device can also be adapted to comparatively small commercially available power tools, in particular hand-held power tools.

The diameter D2 of the second delimitation circle in relation to the diameter D1 of the first delimitation circle can particularly preferably have a ratio in a range from 71% to 77%.

It is proposed that the connector device has an even plurality of clamping wings, in particular at least two or four or six clamping wings. It is furthermore proposed that the connector device has a plurality of clamping wings which are disposed so as to be symmetrical about the tool rotation axis. On account thereof, a particularly effective vibration minimization of the tool device can inter alia be achieved.

It is furthermore proposed that the support flange has a securing means which is configured in such a manner that the operating region in the event of a broken connection between the support flange and the operating region is held between the support flange and the power tool, in particular hand-held power tool, by the support flange and the hand-held power tool in the axial direction of the tool rotation axis. On account thereof, the operating region between the support flange, in particular between the securing means of the support flange, and the tool receptacle device of the power tool, in particular the hand-held power tool, in the event of an unintentionally released connection can be held such that an operator is effectively protected from a flying operating region, in particular parts of the operating region, of a bursting tool device.

The securing means can be designed by way of a maximum radial extent of the support flange that exceeds a minimum radial extent of the operating region, such that the support flange overlaps the operating region in the radial direction, and a form-fitting connection in a fastened state thus results in the axial direction of the tool rotation axis.

The securing means can be embodied as a radial support lip, or support collar, respectively, which delimits the support flange in the radial direction of the tool rotation axis. The securing means is in particular configured as a region of the support flange that overlaps the operating region. The securing means has a connection region which connects the operating region to the support flange in a form-fitting and/or materially integral manner. The connection region extends in a radially external region of the support flange. The connection region in the radial direction is disposed so as to be adjacent, in particular so as to be adjoining, to the connector device, in particular to the clearance of the connector device. The connection region is embodied as an, in particular annular, preferably circular-ring-shaped, connection face which connects the operating region to the support flange.

The support flange can be embodied as an annular support which in the cross section is configured so as to be L-shaped such that a connection of the operating region to the support flange is preferably established only on a side that is oriented toward the tool receptacle device, or on a side of the tool receptacle device that faces away from the tool receptacle device.

The annular support in the cross section can also be U-shaped. The annular support herein can be assembled from an upper and a lower part-ring which are preferably connected to one another, in particular are mutually press-fitted.

It is furthermore proposed that the connector device has at least one tool assembly coding element which in a state of the tool device disposed on the tool receptacle device is provided for interacting with at least one assembly coding element of the tool receptacle device. The tool assembly coding element of the tool device is preferably configured as a mechanical tool assembly coding element such as, for example, as a clearance, as an appendage, as a groove, as a web, as an embossing, or the like. However, it is also conceivable for the tool assembly coding element of the tool device to be configured as an electronic tool assembly coding element such as, for example, as an RFID chip, as an NFC chip, as a radio wave evaluation appliance, as an electronic reading appliance (barcode reader, data matrix code reader, etc.) or the like, or for the tool assembly coding element of the tool device to be configured as a combination of a mechanical and an electronic tool assembly coding element. The tool assembly coding element of the tool device, in particular in a state of the tool device disposed on the tool receptacle device, is preferably provided for interacting with at least one assembly coding element of the entrainment device or with at least one assembly coding element of the clamping device according to a key/keyhole principle. The tool device preferably comprises a multiplicity of tool assembly coding elements, in particular at least two, preferably at least three, and most particularly preferably at least four. The tool device preferably comprises an identical number, depending on a number of assembly coding elements of the tool receptacle device. However, it is also conceivable for the tool device to have a number of tool assembly coding elements which deviates from a number of assembly coding elements of the tool receptacle device, in particular is larger than a number of assembly coding elements of the tool receptacle device. The at least one tool assembly coding element of the tool device, in particular in addition to an assembly coding function, can preferably be configured or can act as a stress-relief notch. In order for the tool device to be assembled and/or fastened to the tool receptacle device, a mechanical and/or electronic evaluation of the at least one tool assembly coding element of the tool device is preferably to be provided, in particular by means of the at least one assembly coding element of the tool receptacle device, so as to preferably accept an assembly and/or fastening of the tool device to the tool receptacle device. It is conceivable that a movement of the clamping device is capable of being blocked, in particular in a mechanical and/or electronic manner, until an assembly and/or fastening is accepted. It is conceivable that the at least one tool assembly coding element of the tool device is provided for activating, in particular moving, the at least one assembly coding element of the tool receptacle device, in particular so as to enable an assembly and/or a fastening of the tool device to the tool receptacle device to be accepted. Alternatively or additionally, it is conceivable that the tool device has at least one further tool assembly coding element, in particular an embossing, which is provided for activating, in particular moving, at least one further assembly coding element of the tool receptacle device, said further assembly coding element being in particular movably mounted, in particular on the bearing face, so as to enable an assembly and/or a fastening of the tool device to the tool receptacle device to be accepted.

A faulty assembly of the tool device on the tool receptacle device can advantageously be largely avoided by means of the design embodiment according to the disclosure. A disposal of tool devices on the tool receptacle device that are unsuitable for a safe operation of the power tool can advantageously be counteracted. For example, a disposal of a tool device which is provided for power tools having a low maximum rotating speed on a power tool having a high maximum rotating speed can advantageously be counteracted. A high level of operator safety can advantageously be implemented.

It is furthermore proposed that the at least one tool assembly coding element is disposed on the at least one clamping wing of the connector device. In the case of a design embodiment of the tool assembly coding element that is disposed on the clamping wing as a clearance, the tool assembly coding element is preferably incorporated in the clamping wing in such a manner that a resistance property of the clamping wing in relation to a plastic deformation as a result of operational stress is reduced to at most a stress limit of the clamping wing. It is conceivable that at least one reinforcement element such as, for example, a reinforcement rib or the like, is disposed on the clamping wing. The at least one tool assembly coding element that is disposed on the clamping wing in a state of the tool device disposed on the tool receptacle device is preferably provided for interacting with the at least one assembly coding element of the clamping device that is disposed on the hook jaw. A secure assembly or fastening coding according to a key/keyhole principle can advantageously be achieved by means of the design embodiment according to the disclosure.

It is moreover proposed that the at least one tool assembly coding element along a radial axis has a maximum extent which at most corresponds to a maximum spacing between the first delimitation circle and a second delimitation circle of the connector device. The at least one tool assembly coding element that is disposed on the clamping wing preferably has a maximum extent along a direction that runs so as to be transverse, in particular at least substantially perpendicular, to the tool rotation axis, in particular a radial axis of the tool device, which is equal in size or smaller than a maximum spacing between a first delimitation circle and a second delimitation circle of the tool device. A reliable and secure coding can advantageously be achieved by means of the design embodiment according to the disclosure.

It is furthermore proposed that the at least one tool assembly coding element is disposed on the at least one clamping wing of the connector device in an angular range between a drive edge and a coding edge of the connector device. The angular range has in particular a maximum extent of less than 90°, preferably of less than 60°, and in particular preferably of less than 40°. A secure fastening coding can advantageously be achieved by means of the design embodiment according to the disclosure. A fastening of the tool device to unsuitable power tools can advantageously be largely avoided. Prevention of injuries to an operator as a result of a fastening of the tool device to unsuitable power tools can advantageously be achieved.

Moreover, a tool device having at least one operating region which is specified for acting on a workpiece or a workpiece assembly, and at least one connector device which is specified for receiving driving forces, and at least one connection the region which is specified for transmitting the driving forces to said operating region, for use with a power tool, in particular with a hand-held power tool, is proposed.

A connection region can in particular be disposed between said connector device and each of said operating regions. Preferably, the at least one connection region, preferably all connection regions, can be disposed substantially in the region, in particular above, one of the second lower support plane and preferably substantially coincide with the support plane.

A particularly stable connector device and thus a good introduction of torque into the tool device are in particular achievable on account thereof.

Moreover, a use of a tool device having an angle grinder is proposed, wherein the tool device is capable of being operated at a rotating speed of more than 4000 or more than 10,000 or more than 20,000 revolutions per minute.

"Capable of being operated" in this context is to be understood to be capable of being operated in a reliable manner such that a use of a tool device with a power tool, in particular an angle grinder, corresponds to an identical or at least approximately similar length period of use, or service life, respectively, of the tool device such as of a fever grinding disk used with an angle grinder, for example. The period of use or service life, respectively, is in particular to be understood as a usual service life of a grinding means that is driven by an angle grinder in the abrasive tool sector.

A method for producing a tool device is furthermore proposed, wherein the tool device has a connector device having a clearance which is produced by means of a punching method.

The disclosure furthermore proceeds from a power tool system having a tool device as disclosed herein and having at least one hand-held power tool which comprises at least one tool receptacle device. It is proposed that the tool device has at least one tool assembly coding element which in a state of the tool device disposed on the tool receptacle device is provided for interacting with at least one assembly coding element of the tool receptacle device. The entrainment device preferably comprises at least one assembly coding element which in a state of the tool device disposed on the tool receptacle device is provided for interacting with a tool assembly coding element of the tool device. The at least one assembly coding element of the entrainment device is preferably provided for coding a disposal or a placement of the tool device on or onto the tool receptacle device, in particular the bearing face. The at least one assembly coding element of the entrainment device is preferably provided for coding a disposal or a placement of the tool device on or onto the tool receptacle device, in particular the bearing face, according to a key/keyhole principle. The at least one assembly coding element of the entrainment device is preferably configured as an axial coding element, in particular as an axial coding element that acts along a direction which runs so as to be at least substantially parallel with the output axis. The at least one assembly coding element of the entrainment device is preferably provided for coding an axial placement potential of the tool device onto the entrainment device. The at least one assembly coding element of the entrainment device is preferably configured so as to be integral to the entrainment device, in particular to an entrainment jaw of the entrainment device. However, it is also conceivable that the at least one assembly coding element of the entrainment device is configured so as to be separate from the entrainment device, in particular from the entrainment jaw, and is fixed to the entrainment device, in particular to the entrainment jaw, by means of a connection that is considered expedient by a person skilled in the art. The assembly coding element is preferably is configured as a mechanical assembly coding element such as, for example, as a clearance, as an appendage, as a groove, as a web or the like. However, it is also conceivable for the assembly coding element to be configured as an electronic assembly coding element such as, for example, as an RFID chip, as an NFC chip, as a radio wave evaluation appliance, as an electronic reading appliance (barcode reader, data matrix code reader, etc.) or the like, or for the assembly coding element to be configured as a combination of a mechanical and an electronic assembly coding element. The tool assembly coding element of the tool device is preferably configured so as to correspond to the assembly coding element of the entrainment device. In the case of a design embodiment of the assembly coding element as a mechanical assembly coding element, the tool assembly coding element is likewise configured as a mechanical tool assembly coding element such as, for example, as a clearance, as an appendage, as a groove, as a web or the like. In the case of a design embodiment of the assembly coding element as an electronic assembly coding element, the tool assembly coding element is likewise configured as an electronic tool assembly coding element such as, for example, as an RFID chip, as an NFC chip, as a radio wave evaluation appliance, as an electronic reading appliance (barcode reader, data matrix code reader, etc.) or the like. Further corresponding design embodiments of the assembly coding element and of the tool assembly coding element that are considered expedient by a person skilled in the art are likewise conceivable. The tool receptacle device preferably comprises a multiplicity of assembly coding elements, in particular at least two, preferably at least three, and most particularly preferably at least four. The tool device preferably comprises an identical number, depending on a number of assembly coding elements of the tool receptacle device. However, it is also conceivable for the tool device to have a number of tool assembly coding elements which deviates from a number of assembly coding elements of the tool receptacle device, in particular is larger than a number of assembly coding elements of the tool receptacle device.

The assembly coding element of the entrainment device is preferably disposed on at least one entrainment jaw of the entrainment device. The assembly coding element that is disposed on the at least one entrainment jaw of the entrainment device is preferably configured as an appendage. The assembly coding element that is configured as an appendage preferably has a main alignment which has in an alignment that is directed away from the output axis, in particular along a direction that runs so as to be transverse, in particular at least substantially perpendicular, to the output axis. However, it is also conceivable for the assembly coding element that is disposed on the at least one entrainment jaw of the entrainment device to have another design embodiment that is considered expedient by a person skilled in the art. The assembly coding element that is disposed on the at least one entrainment jaw of the entrainment device is preferably disposed on an external face of the at least one entrainment jaw said external face in particular facing away from the output axis. The assembly coding element that is disposed on the at least one entrainment jaw of the entrainment device is preferably disposed on an external face of the at least one entrainment jaw said external face running so as to be at least substantially parallel with the output axis. Alternatively or additionally, it is conceivable for the tool receptacle device to comprise at least one assembly coding element which is disposed on the bearing face of the tool receptacle device. The assembly coding element that is disposed on the bearing face of the tool receptacle device can be configured as a mechanical or as an electronic assembly coding element.

The assembly coding element of the entrainment device is preferably disposed so as to be contiguous to an internal circumferential face of the at least one entrainment jaw. The assembly coding element that is disposed on the at least one entrainment jaw of the entrainment device is preferably disposed so as to be directly contiguous to the internal circumferential face. Alternatively or additionally, it is conceivable for the assembly coding element that is disposed on the at least one entrainment jaw of the entrainment device to be disposed on an external circumferential face of the at least one entrainment jaw. A surface of the assembly coding element that is disposed on the at least one entrainment jaw of the entrainment device preferably forms part of the internal circumferential face or of the external circumferential face of the at least one entrainment jaw.

The clamping device, in particular the at least one hook device of the clamping device, preferably comprises at least one assembly coding element. The clamping device preferably comprises a multiplicity of, in particular at least two, assembly coding elements. However, it is also conceivable for the clamping device to have a number of assembly coding elements that deviates from one and two, said assembly coding elements being disposed on the hook device. The at least one assembly coding element of the clamping device preferably forms a fixing coding element which is provided for coding a fastening of the tool device to the tool receptacle device. The at least one assembly coding element of the clamping device is preferably provided for coding a fastening of the tool device to the tool receptacle device according to a key/keyhole principle. The at least one assembly coding element of the clamping device is preferably configured as a radial coding element, in particular as a radial coding element which acts along a direction that runs so as to be at least substantially perpendicular to the output axis. The at least one assembly coding element of the clamping device is preferably provided for coding a radially acting fastening of the clamping device to a fastening of the tool device to the tool receptacle device. The assembly coding element of the clamping device is preferably provided for at least largely avoiding or suppressing a fastening of the tool device to the tool receptacle device, in particular to the bearing face, by means of the clamping device in the case of an absence of a corresponding assembly coding element on a tool device. In the case of a presence of a corresponding assembly coding element on a tool device, a fastening as a result of an acceptance of the coding by way of an interaction between the assembly coding element of the clamping device and the corresponding assembly coding element of the tool device is preferably possible. It is conceivable for the tool receptacle device to have only at least the assembly coding element/elements of the entrainment device, or only at least the assembly coding element/elements of the clamping device. It is also conceivable for the tool receptacle device, alternatively or additionally to the assembly coding element/elements of the entrainment device or to the assembly coding element/elements of the clamping device to have further coding elements which enable a coding of a disposal of the tool device to the tool receptacle device, such as, for example, at least one coding element which as a result of a disposal of the tool device on the tool receptacle device is movable so as to accept a disposal of the tool device, at least one additional static coding element on the tool receptacle device which, for example, engages in a clearance on the tool device, at least one additional movably mounted coding element which after a correct disposal of a suitable tool device is preferably movable into a coding clearance of the tool device so as to unlock an operation of the power tool, for example, or further coding elements that are considered expedient by a person skilled in the art.

The assembly coding element of the clamping device is preferably disposed on a hook jaw, in particular in a clamping clearance of the hook jaw. The at least one assembly coding element of the clamping device is preferably configured so as to be integral to the hook jaw. However, it is also conceivable for the at least one assembly coding element of the clamping device to be configured so as to be separate from the hook jaw and to be fixed to the hook jaw by means of a connection that is considered expedient by a person skilled in the art. The assembly coding element of the clamping device is preferably disposed on a clamping face of the clamping device, in particular so as to be directly contiguous to the clamping face which at least partially delimits the clamping clearance. The at least one assembly coding element of the clamping device is preferably configured as an appendage. However, it is also conceivable for the at least one assembly coding element of the clamping device to have another design embodiment which is considered expedient by a person skilled in the art. The at least one assembly coding element of the clamping device can be disposed on the hook jaw so as to be symmetrical or asymmetrical to a central plane, in particular a plane of symmetry, of the hook jaw. The central plane, in particular the plane of symmetry, of the hook jaw preferably runs so as to be at least substantially parallel with the output axis and/or comprises the latter. A disposal of the at least one assembly coding element of the clamping device on the hook jaw said disposal being spaced apart relative to the central plane, in particular to the plane of symmetry, of the hook jaw is also conceivable.

A faulty assembly of the tool device on the tool receptacle device can advantageously be largely avoided by means of the design embodiment according to the disclosure. A disposal of tool devices on the tool receptacle device that are unsuitable for a safe operation of the power tool can advantageously be counteracted. For example, a disposal of a tool device which is provided for power tools having a low maximum rotating speed on a power tool having a high maximum rotating speed can advantageously be counteracted. A disposal, in particular a placement, of an unsuitable tool device on, in particular onto, the tool receptacle device can advantageously be largely avoided in an advantageously reliable manner. A constructively simple design embodiment of an assembly coding can be enabled. A constructively simple design embodiment of an assembly coding can be enabled. A disposal, in particular a placement, of an unsuitable tool device on, in particular onto, the tool receptacle device can advantageously be largely avoided in a reliable manner. A fastening of a tool device can advantageously be coded by means of the clamping device. For example, a fixing potential can be blocked in the case of an unsuitable design embodiment of a tool device which is configured so as to be decoupled from element that corresponds to the at least one assembly coding element of the clamping device. A fastening of an unsuitable tool device on the tool receptacle device can reliably be counteracted. A compact design embodiment can advantageously be implemented. A reliable protection of the assembly coding element of the clamping device from damage can advantageously be enabled in particular by a disposal of the at least one assembly coding element in the clamping clearance of the hook jaw.

The tool device according to the disclosure and/or the power tool system according to the disclosure, are/is not intended to be limited to the application and embodiment described above. For fulfilling a functional mode described herein, the tool device according to the disclosure and/or the power tool system according to disclosure can in particular have a number that deviates from a number, mentioned herein, of individual elements, components and units as well as method steps. Moreover, in the case of the ranges of values specified in this disclosure, values that lie within the cited limits should also be considered as being disclosed and as being able to be used as desired.

BRIEF DESCRIPTION FO THE DRAWINGS

Further advantages are derived from the description of the drawings hereunder. Exemplary embodiments of the disclosure are illustrated in the drawings. The drawings, the description and the claims include numerous features in combination. A person skilled in the art will expediently also consider the features individually and combine the latter so as to form expedient further combinations. In the figures:

FIG. 4a shows an enlarged view of the support flange from FIG. 3a;

FIG. 4b shows an enlarged view of a clamping wing of the support flange from FIG. 3a;

FIG. 16b shows a sectional view of the tool device from FIG. 16a;

FIG. 17b shows a sectional view of the tool device from FIG. 17a;

FIG. 18b shows a sectional view of the tool device from FIG. 18a.

DETAILED DESCRIPTION

Identical components are provided with the same reference signs in the following figures.

FIGS. 1 to 8b relate in each case to a tool device 11 for machining, in particular grinding and/or separating, one or a plurality of workpieces comprising at least, for example, a timber material, a metallic material, a plastics material, a mineral material, or combinations of said materials.

Figure 1:
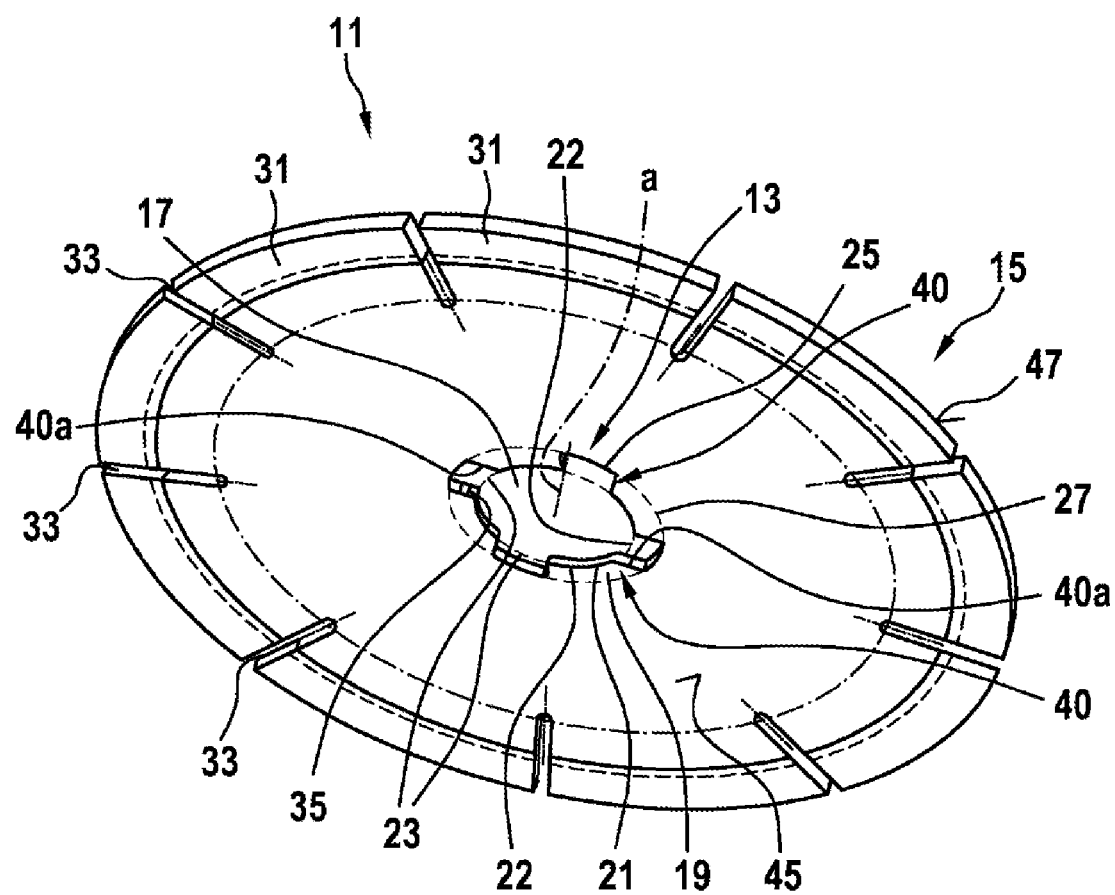
FIG. 1 shows a perspective view of a first embodiment of a tool device according to the disclosure.
Figure 2:
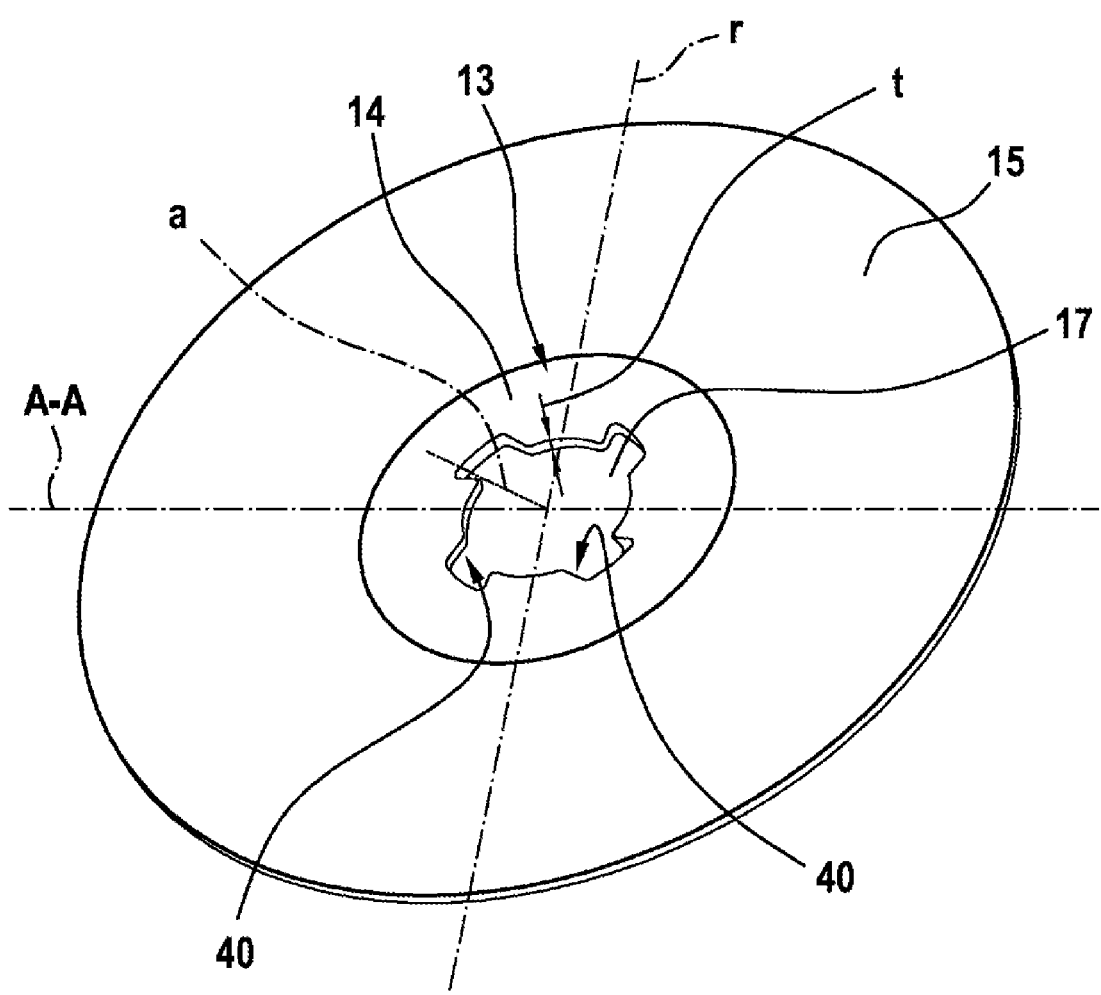
FIG. 2 shows a perspective view of a second embodiment of a tool device according to the disclosure.

FIG. 1 shows a first embodiment of a tool device 11 according to the disclosure in a flat and at least substantially disk-shaped embodiment. The tool device 11 has an in particular fictitious tool rotation axis a and a connector device 13 for connecting the tool device 11 to a tool receptacle device 213 (cf. FIGS. 9 to 13) of a hand-held power tool 211, and an operating region 15.

The tool rotation axis a defines a center and/or an axis of the tool device 11 about which the tool device 11 rotates in the operation by means of the power tool 211. The connector device 13 is disposed in a radially inside region of the tool device 11 about the tool rotation axis a.

The connector device 13 has a clearance 17 which forms a material cut-out through the tool device 11 and which in the axial direction of the tool rotation axis a extends through an entire material thickness t of the connector device 13. The clearance 17 can be provided for completely encompassing, in particular surrounding along a circumferential direction of the tool receptacle device 213 (cf. FIG. 9), an entrainment device 215 and a clamping device 217 of the tool receptacle device 213. The clearance 17 completely surrounds the tool rotation axis a in at least one plane such as, for example, an orthogonal plane that extends so as to be orthogonal to the tool rotation axis a.

The connector device 13 is capable of being fastened to the tool receptacle device 213 in such a manner that an output axis A of an output shaft of the hand-held power tool 211 and the tool rotation axis a of the tool device 11 substantially coincide.

The connector device 13 has at least one clamping wing 19. The connector device 13 preferably has four clamping wings 19 which in the radial direction extend toward the tool rotation axis a and at least in portions delimit the clearance 17 of the connector device 13 in the radial direction. The clamping wings 19, in particular substantially in the radial direction to the tool rotation axis a, are delimited by in each case a first delimitation edge 21 which lies on a first, in particular minimum, delimitation circle 23 about the tool rotation axis a.

The clamping wings 19, in particular substantially, in the radial direction to the tool rotation axis a, are delimited by in each case a second delimitation edge 25 which lies on a second, in particular maximum, delimitation circle 27 about the tool rotation axis a. In particular, a diameter D1 of the first delimitation circle 23 is smaller than a diameter D2 of the second delimitation circle 27. The first delimitation edges 25 and the second delimitation edges 25 of the clamping wings 19 at least in portions preferably delimit the clearance 17 in the radial direction of the tool rotation axis a. The first delimitation circle 23 is disposed about the tool rotation axis a so as to be concentric with the second delimitation circle 27. The first diameter D1 of the first delimitation edge 23 is approximately 22 mm large, on account of which the tool device 11 also fits onto conventional hand-held power tools, in particular angle grinders, such that a backward compatibility is guaranteed. Alternatively, the first diameter D1 of the first delimitation edge 23 can deviate from, in particular be smaller than, 22 mm, such that the tool device 11 also fits onto conventional hand-held power tools, in particular angle grinders, of smaller dimensions.

The second delimitation edge 25 can be specified for centering and supporting the tool device 11 in the radial direction.

The first delimitation edge 21 can be curved so as to correspond to a profile of an arc of the delimitation circle 23 about the tool rotation axis a. The second delimitation edge 25 can be curved so as to correspond to a profile of an arc of the delimitation circle 27 about the tool rotation axis a.

The connector device 13 has a torque-receiving region 40. The torque-receiving region 40 has an in particular rectilinear or curved drive edge 40a and/or an in particular planar or curved drive face 40b. On account thereof, the torque-receiving region 40 of the tool device 11 can contact a torque-transmitting region 219 of the tool receptacle device 213 in particular in the form of a punctiform, preferably in the form of a linear, more preferably in the form of a planar contact. The torque-receiving region 40 is disposed so as to be spaced apart from the tool rotation axis a.

The torque-receiving region 40 of the connector device 13 is provided for transmitting driving forces from the power tool 211 to the tool device 11. The torque-receiving region 40 in the axial direction of the tool rotation axis a is disposed between the clearance 17 of the tool device 11 that extends through the entire material thickness t of the tool device 11. The clearance 17 has at least four torque-receiving regions 40 which are mutually disposed so as to be rotationally symmetrical about the tool rotation axis a.

The drive face 40b, in particular a drive face region of the drive face 40b, is provided for providing a form-fitting and/or force-fitting connection to the tool receptacle device 213 of the hand-held power tool 211, in particular a connection that is capable of rotatingly operating the tool device 11. The drive face 40b in the axial direction of the tool rotation axis a is delimited by at least the drive edge 40a. At least the drive face region is embodied in a planar manner. The drive faces 40b and the drive edges 40a are angled, in particular counter to a rotation direction of the tool receptacle device 213 in operation.

Figure 3A:
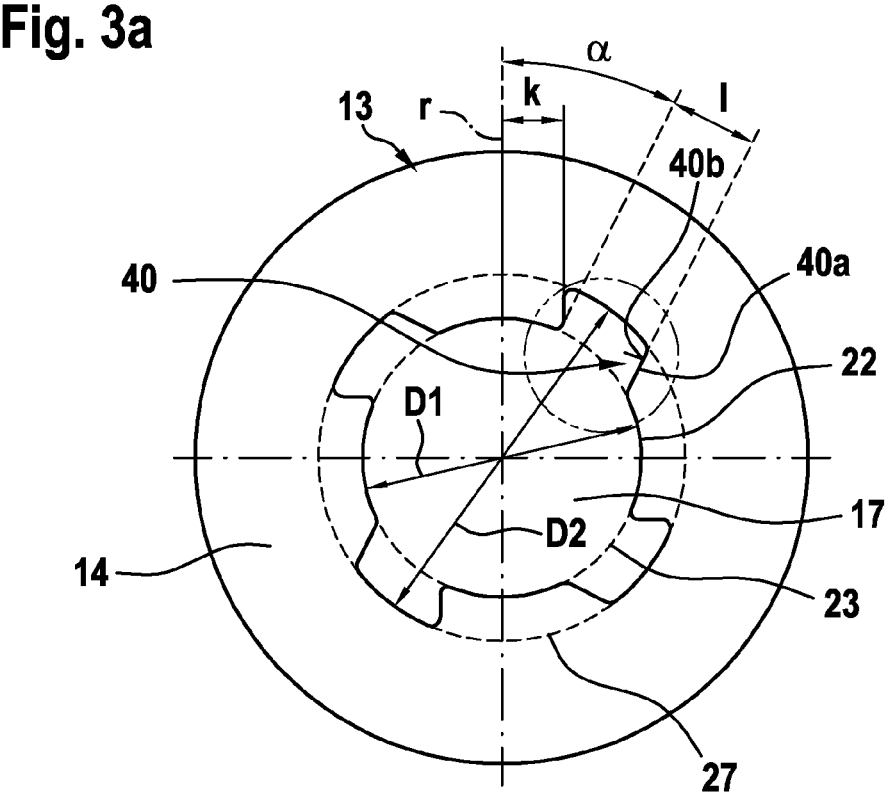
FIG. 3a shows a support flange of the second embodiment of a tool device.

The drive faces 40b and the drive edges 40a in the circumferential direction about the tool rotation axis a are angled at an angle α of up to 30°, particularly of up to 25°, in relation to a plane that is defined by an axial direction and a radial direction of the tool rotation axis a, as can be seen in FIG. 3a.

Figure 4A:
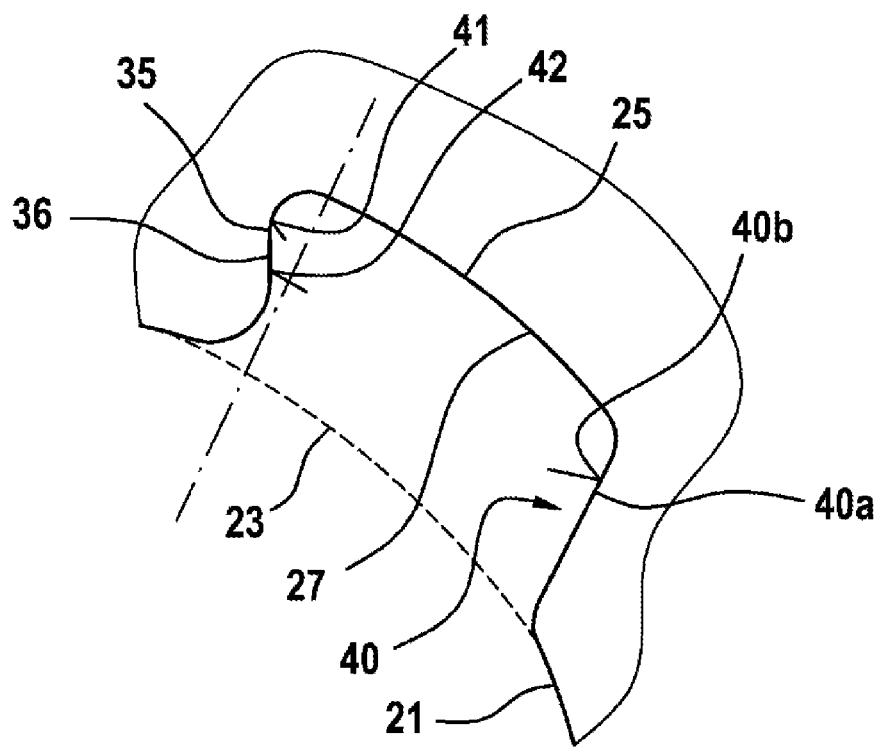

The first delimitation edge 21 in the circumferential direction about the tool rotation axis a is delimited by a coding edge 35, in particular a coding edge region of the coding edge 35, and by a drive edge 40a, in particular a drive edge region of a drive edge 40a, as can be seen in FIG. 4a, for example. At least the drive edge region of the drive edge 40a is configured so as to be rectilinear. At least the coding edge region of the coding edge 35 is configured so as to be rectilinear. At least the coding edge 35 is configured so as to be substantially curved.

The coding edge 35 connects the first delimitation edge 21 to the second delimitation edge 25. The drive edge 40a connects the first delimitation edge 21 to an adjacent second delimitation edge 25. The coding edge 35 and the drive edge 40a extend substantially in the radial direction.

The first delimitation circle 23 has at least one fictitious projection edge 22 which lies between two first delimitation edges 21 that are adjacent in the circumferential direction, and which lies on the first delimitation circle 23 and in the circumferential direction about the tool rotation axis a runs so as to be concentric with the first delimitation circle 23. An extent in the circumferential direction of the at least one first delimitation edge 21 that lies on the first delimitation circle 23 herein is by up to 10% larger than an extent of the adjacent fictitious projection edge 22 that lies on the first delimitation circle 23. Preferably, a, in particular each, projection edge 22 is smaller than a first delimitation edge 21 that is adjacent to the projection edge 22. A particularly advantageous centering, in particular a preliminary centering or rough centering, respectively, of the tool device 11 can be achieved on account thereof.

The clamping wings 19, in particular substantially in the radial direction to the tool rotation axis a, can in each case be delimited by a second delimitation edge 25 which lies on a second, in particular maximum, delimitation circle 27 about the tool rotation axis a.

The delimitation edges 21, 25, the coding edges 35, and the drive edges 40a form a delimitation contour of the clearance 17. The first delimitation edge 21, the coding edge 35, and the drive edge 40a form in particular a contour of the clamping wing 19. The drive edge 40a and the coding edge 35 delimit the first delimitation edge 21 in the circumferential direction about the tool rotation axis a and adjoin the first delimitation edge 21.

The drive edge 40a and/or the drive face 40b in the circumferential direction about the tool rotation axis a are angled at an angle α about up to 30°, such as for example approximately 25°, in relation to a plane that is defined by an axial direction and a radial direction of the tool rotation axis a.

The drive faces 40b and the drive edges 40a are angled, in particular counter to a rotation direction of the tool receptacle device 213 in operation.

The drive face 40b and the drive edges 40a in the circumferential direction about the tool rotation axis a are angled at an angle α of up to 30°, such as for example approximately 25°, in relation to a plane that is defined by an axial direction and a radial direction of the tool rotation axis a, as can be seen in FIG. 3a.

The coding edge 35 is disposed so as to be substantially parallel with a radial direction of the tool rotation axis a that forms a radial axis r and is spaced apart by up to 8 mm, in particular by up to 6 mm, such as for example 4.85 mm. The coding edge 35 in the circumferential direction of the tool rotation axis a is angled in relation to the drive edge 40a, and is in particular angled preferably by up to 40° counter to a rotation direction of the tool receptacle device 213 in operation of the power tool 211. In particular, an extension of the coding edge 35, in particular of the coding edge region, and an extension of the drive edge 40a, in particular of the drive edge region, of a clamping wing that in the circumferential direction is adjacent to the coding edge run on the same side in relation to the tool rotation axis a such that the tool rotation axis a does not separate the extension of the coding edge 35 and the extension of the drive edge 40a.

The clamping wings 19 are disposed so as to be symmetrical in the circumferential direction about the tool rotation axis a. The clamping wings 19 are disposed so as to be mutually offset by 90° in the circumferential direction about the tool rotation axis a, such that four rotary positions result in a complete revolution by 360° of the tool device 11 about the tool rotation axis a. Alternatively, the clamping wings 19 can be disposed so as to be mutually offset by 180° or 60° in the circumferential direction about the tool rotation axis a, such that two or six rotary positions result in a complete revolution by 360° of the tool device 11 about the tool rotation axis a.

The clamping wings 19 extend at least substantially along an orthogonal plane that extends in the radial direction of the tool rotation axis a. The orthogonal plane extends in particular so as to be substantially orthogonal to the tool rotation axis a.

The clamping wing 19, or the clamping wings 19, is/are in particular asymmetrical, in particular not mirror-symmetrical, in relation to each plane of symmetry defined by a radial and an axial direction of the tool rotation axis a.

Figure 4B:
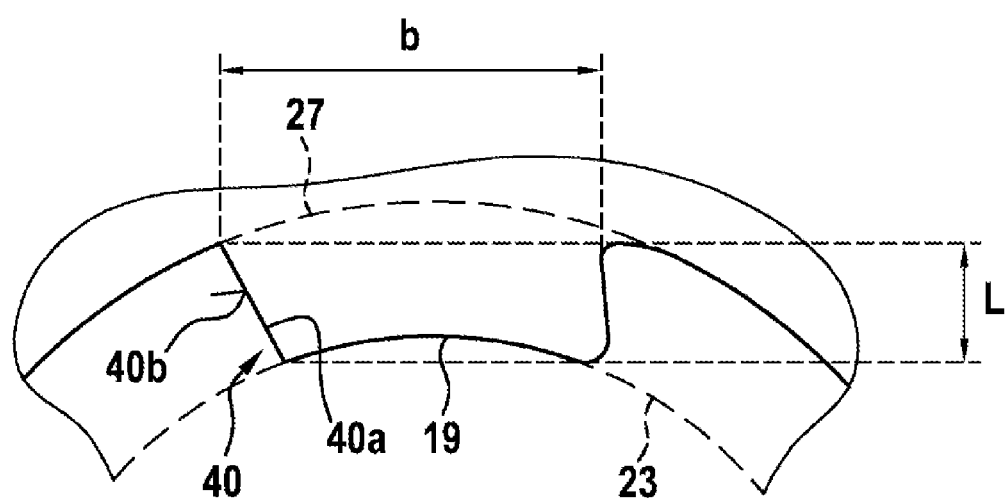

FIG. 4b shows a detailed view of one of the clamping wings 19. The clamping wing 19 preferably has a maximum benchmark D that corresponds to a spring rate having a value from a value range from 10,000 N/mm to 350,000 N/mm. The maximum benchmark D of the clamping wing that corresponds to a spring rate preferably results from the following correlation:

F=Dz, wherein $$D = \frac{3EI}{L^S}, Z = \frac{EL^S}{3EI}, I = \frac{bh^3}{12},$$

where L is the in particular mean maximum extent of the clamping wing 19 between the first delimitation circle 23 and the second delimitation circle 27, in particular along a direction that runs at least substantially parallel with the radial axis r, where b is the maximum tangential extent of the clamping wing 19 tangential to the second delimitation circles 27, and where h is the maximum material thickness of the clamping wing 19 along the axial direction of the tool rotation axis a. The maximum material thickness h can preferably correspond to a value from a value range from 0.5 mm to 1.6 mm.

The clearance 17 is configured in such a manner that the tool device 11 is capable of being push-fitted onto the tool receptacle device 213 of the hand-held power tool 211 only by way of one side and of being operated in this manner.

The delimitation contour of the clearance 17 at least in portions has in particular a coding which is embodied as the coding edge 35 and which is specified for designing the tool device 11 to be connectable to the tool receptacle device 213 in a form-fitting manner in the circumferential direction about the tool rotation axis a only from a side of the tool device 11 that is provided for receiving the tool device 11 having the tool receptacle device 213 of the hand-held power tool 211. The coding herein is configured in such a manner that the clearance 17 prevents a form-fitting connection of the tool device 11 to the tool receptacle device 213 by way of an averted side of the tool device 11, and thus avoids a mirror-inverted assembly of the tool device 11. On account thereof, an immediate error detection and/or error avoidance according to the poka-yoke principle can be achieved, such that an operator obtains feedback when the tool device is not connected to the tool receptacle device 213 by way of a side that is provided for receiving the tool receptacle device 213.

The coding herein can be performed by way of the coding edge 35 that connects the first delimitation edge 21 and the second delimitation edge 25, and/or by way of the drive edge 40a of the clearance 17. In particular, the coding can be performed by means of an alignment of the coding edge 35 of the clearance 17 such that it is ensured that the tool device 11 is not capable of being connected on both sides to an at least conjugated contour of the tool receptacle device 213, said conjugated contour corresponding to the coding edge 35 and/or the drive edge 40a, in the case of an alignment of the coding edge 35 not being aligned so as to be symmetrical or axially symmetrical, respectively, in relation to a drive edge 40a.

"Being capable of being connected on one side" in this context is to be understood as a side-dependent coding of the connector device 13 of the tool device 11, said coding being provided for enabling a form-fitting rotating entrainment of the tool device 11 by way of the tool receptacle device 213 of the hand-held power tool 211 in a side-dependent manner so as to avoid a mirror-inverted assembly of the tool device 11.

The clamping wing 19 extends at least substantially along an orthogonal plane to the tool rotation axis a and is asymmetrical, in particular not mirror-symmetrical, in relation to each plane of symmetry defined by a radial and an axial direction of the tool rotation axis a.

The radial axis r is in particular disposed in such a manner that a clamping wing 19 in the circumferential direction about the tool rotation axis a is substantially half, in particular along a radial plane defined by an axial and a radial direction, is divided into two halves of approximately the same size. The radial axis r preferably forms an angle bisector which divides an extent of at least one clamping wing 19 in the circumferential direction.

An extent of at least one of the clamping wings 19 in the circumferential direction about the tool rotation axis a is preferably configured in such a manner that the at least one clamping wing 19 does not have any axial symmetry such that a connection capability of the tool device 11 to the hand-held power tool 211 is possible in particular only in a direction-dependent manner or on one side, respectively.

The tool device 11 has a first lateral face 45 which in a fastened fastening state is directed toward the hand-held power tool 211. The tool device 11 has a second lateral face 47 which faces away from the first lateral face 45 and which in a fastening state fastened to the hand-held power tool 211 is directed away from the hand-held power tool 211. The first lateral face 45 and the second lateral face 47 delimit the tool device 11 in the axial direction to the tool rotation axis a.

The first lateral face 45 of the tool device 11 has in particular a radially inside first lateral face region 46 which is provided for forming a contact face for bearing on a tool receptacle device 213 of the power tool 211, on account of which material stresses of the tool device 11 in the axial direction are minimized.

The operating region 15 is embodied so as to be disk-shaped and flat. The operating region 15 is radially outside and delimits the radial extent of the tool device 11. The operating region 15 has a plurality of separation segments 31 which are provided for cutting or separating, respectively, a workpiece to be machined. The operating region 15 has a plurality of material cut-outs 33 which extend radially to the tool rotation axis a and which are provided for at least in portions separating the separation segments 31 in the circumferential direction about the tool rotation axis a. The separation segments 31 preferably have a plurality of cutting elements which are embodied as abrasive members and which are disposed on an end side of the tool device 11, for example, and form a delimitation of the tool device 11, or a taper that forms a cutting edge (not illustrated in more detail), for example. The taper can taper in the radial direction of the tool rotation axis a and delimit the maximum radial extent of the tool device 11.

In one alternative embodiment the tool device 11 can be configured as a grinding disk for the abrasive machining of workpieces. The operating region 15 herein can have a plurality of grinding elements such as abrasive granules, respectively, for machining workpieces. In one further alternative embodiment the tool device 11 can be configured as a circular saw blade for machining workpieces by cutting. The operating region 15 herein can have a plurality of cutting teeth (not illustrated in more detail) for cutting or separating, respectively workpieces, said cutting teeth projecting in the radial direction of the tool rotation axis a.

A plurality of design embodiments of an operating region 15 which can be used with the connector device 13 according to the disclosure of the tool device 11 are herein known to a person skilled in the art, such that not all potential design embodiments of the operating region 15 are explicitly discussed.

Figure 5:
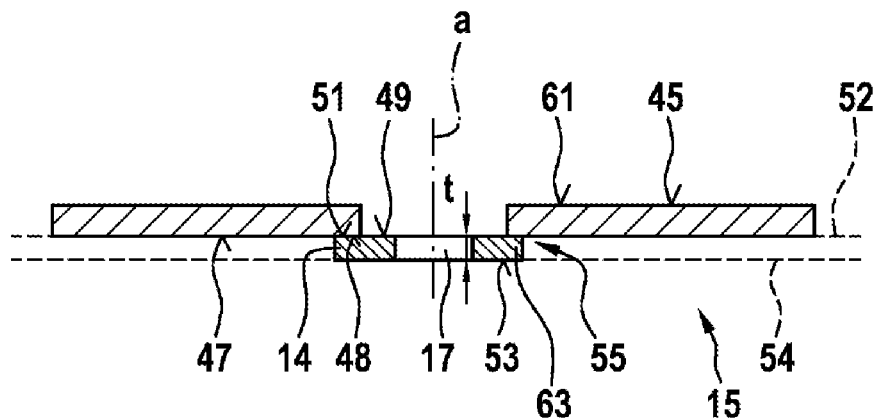
FIG. 5 shows a sectional view A-A of the tool device from FIG. 2.

FIGS. 2 to 8 show further embodiments of the tool device 11 according to the disclosure. The connector device 13 herein is configured as a support flange 14 which is connected in a form-fitting and/or materially integral manner to the operating region 15. The operating region 15 surrounds the support flange 14 by 360° in a plane and has an in particular minimum radial extent about the tool rotation axis a which is smaller than an in particular maximum radial extent of the support flange 14. The support flange 14 is connected to the operating region 15 so as to overlap the latter, as can be seen in FIG. 5 in a cross-sectional view A-A through the tool device from FIG. 2.

The support flange 14 from FIGS. 2 to 5 is embodied so as to be disk-shaped and flat. The support flange 14 has a first support plane 52 and a second support plane 54 that is spaced apart from the first support plane 52. The support planes 52, 54 are disposed so as to be orthogonal to the tool rotation axis a and form a material thickness t of the connector device 13.

The first support plane 52 in the direction of the tool rotation axis a delimits the support flange 14 on that side that is oriented toward the hand-held power tool 211, in particular when viewed in a state of the tool device 11 disposed on the hand-held power tool 211. The second support plane 54 delimits the tool device 211 on that side that faces away from the hand-held power tool 211, in particular when viewed in a state of the tool device 11 disposed on the hand-held power tool 211.

The support flange 14 has a first connector face 49 which in a fastening state connected to the hand-held power tool 211 is directed toward the power tool 211. The support flange 14 has a first support face 51 which in a fastening state connected to the hand-held power tool 211 is directed toward the power tool 211. The support flange 14 has a second support face 53 that faces away from the first support face 51. The first support face 51 and the second support face 53 delimit the support flange 14 in the axial direction of the tool rotation axis a. The first support face 51 in this embodiment is configured as a face region of the first connector face 49, since the first connector face 49 transitions to the first support face 51.

The first support plane 52 extends along a first support face 51, or the connector face 49, respectively. The second support plane 54 extends along a second support face 53. The torque-receiving region 40 extends in the axial direction between the two support faces 51, 53.

The support flange 14 is connected to the operating region 15 so as to overlap the latter, such that a first support face 51 of the support flange 14 is connected in a form-fitting and/or materially integral manner to a second lateral face 47 of the operating region 15, and forms a circular-ring-shaped connection region 55. The second lateral face 47 preferably has a radially inside second lateral face region 48 which is provided to be connected, in particular in a materially integral and/or form-fitting manner, to a radially outside first support face region 51 of the first support face 51.

The support flange 14 can be connected in a form-fitting manner to the operating region 15. A rivet connection or another type of connection such as, for example, a plug connection can be used, which by virtue of material protrusions (not illustrated in more detail) which, for example, extend in the axial direction to the tool rotation axis a and which, for example, can be created by means of a partial solid deformation of the support flange 14 in the axial direction of the tool rotation axis a of the support flange 14, are plug-fitted into the operating region 15 so as to penetrate the operating region 15 and to transmit in form-fitting manner a rotary force action from the support flange 14 to the operating region 15.

The support flange 14 can have a securing means 63 that is configured as a support lip, or be configured as a securing means 63 such that the securing means 63 in a fastening state to the hand-held power tool 211 is disposed in such a manner that the operating region 15 in the event of a broken connection, or in the event of an unintentional release of the connection, respectively, between support flange 14 and the operating region 15 is secured by the support flange 14 and the hand-held power tool 211 in that the support flange 14, in particular the securing means 63 of the support flange 14, in a form-fitting manner prevents a movement of the operating region 15 in the axial direction of the tool rotation axis a. The operating region 15 in the event of an unintentionally released connection can preferably be held between the support flange 14, in particular between the securing means 63 of the support flange 14, and the tool receptacle device 213, such that an operator is effectively protected from a flying operating region 15.

The securing means 63 is preferably designed by way of a maximum radial extent of the support flange 14 which exceeds a minimum radial extent of the operating region 15 such that the support flange 14 overlaps the operating region 15, and thus results in a connection of the operating region 15 in a state chucked in the tool receptacle device 213 of the hand-held power tool 211 that is form-fitting in the axial direction of the tool rotation axis a.

Figure 3B:
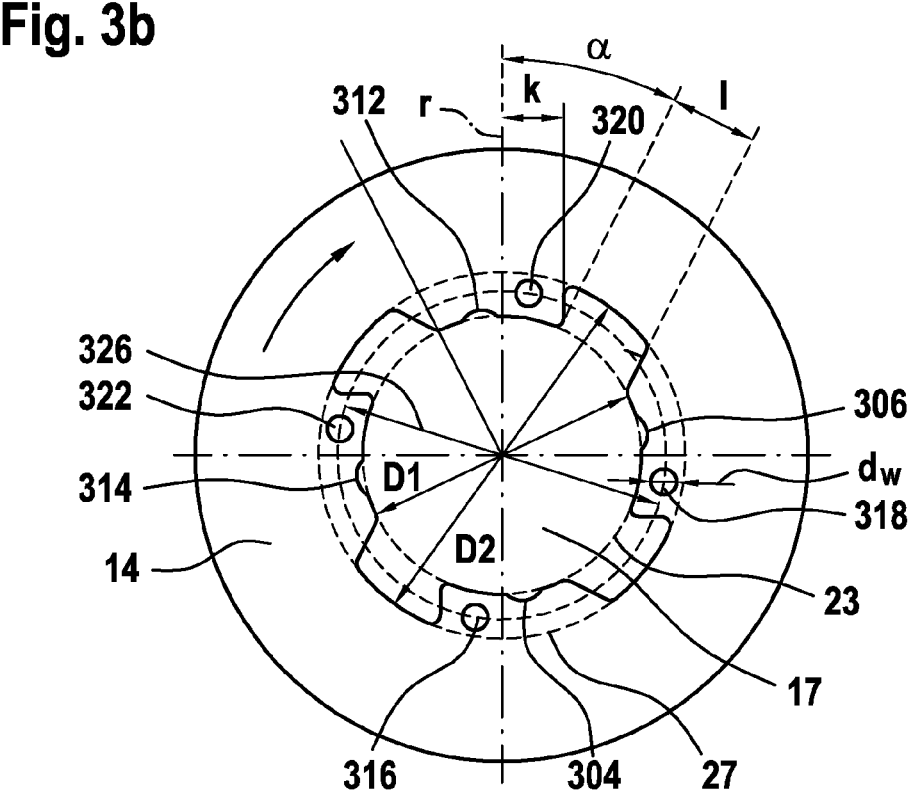
FIG. 3b shows a support flange of a third embodiment of a tool device.

FIG. 3b shows an embodiment of the tool device 11 according to the disclosure having at least one tool assembly coding element 304, 306, 312, 314 which in a state of the tool device 11 disposed on the tool receptacle device 213 is provided for interacting with at least one assembly coding element 300, 302, 308, 310 of the tool receptacle device 213. The at least one tool assembly coding element 304, 306, 312, 314 is disposed on the at least one clamping wing 19 of the connector device 13. The at least one tool assembly coding element 304, 306, 312, 314 along a radial axis r has a maximum extent which at most corresponds to a maximum spacing between the first delimitation circle 23 and the second delimitation circle 27 of the connector device 13, such as can be derived in an exemplary manner from the different potential embodiments of the connector device 13 in FIG. 14. The at least one tool assembly coding element 304, 306, 312, 314 is preferably disposed in an angular range between the drive edge 40a and the coding edge 35 of the connector device 13 on the clamping wing 19 of the connector device 13.

Figure 15A:
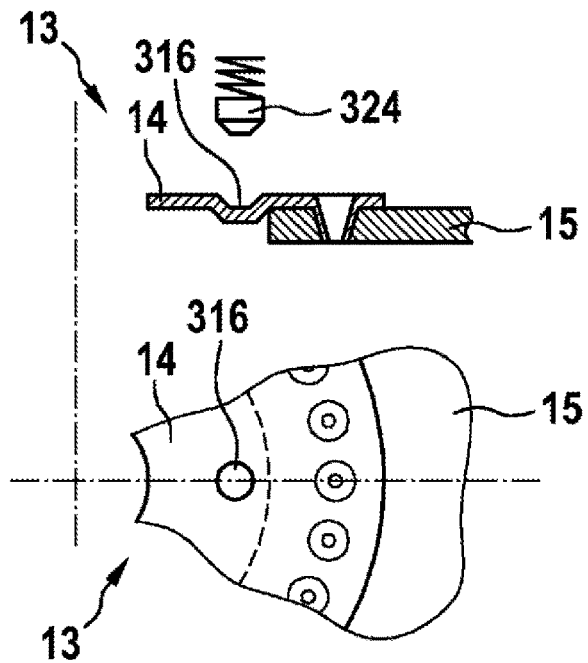
FIG. 15a shows a design embodiment of a tool device and/or of a tool receptacle device having at least one spring-loaded securing and/or positioning element.
Figure 15B:
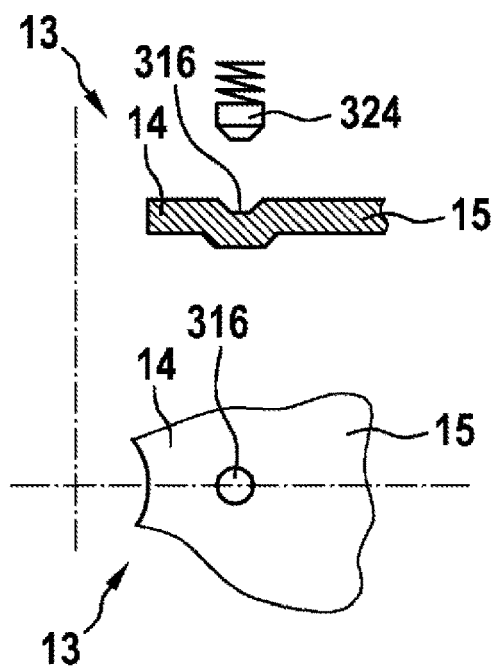
FIG. 15b shows a design embodiment of the tool device and/or of the tool receptacle device as an alternative to FIG. 15a, having at least one spring-loaded securing and/or positioning element.

The tool device 11 shown in FIG. 3b, alternatively or additionally to the at least one tool assembly coding element 304, 306, 312, 314, comprises at least one additional tool assembly coding element 316, 318, 320, 322 which is provided for receiving a securing and/or positioning element 324 (illustrated in an exemplary manner in FIGS. 15a and 15b) that is movably mounted on the tool receptacle device 213. The movably mounted securing and/or positioning element 324 of the tool receptacle device 213 can be configured, for example, as a spring-loaded latching bolt or the like. The at least one additional tool assembly coding element 316, 318, 320, 322 is preferably disposed on the clamping wing 19. The at least one additional tool assembly coding element 316, 318, 320, 322 is preferably configured as a material-free cut-out in the clamping wing 19, in particular as a clearance that extends completely through a maximum material thickness h of the clamping wing 19. However, it is also conceivable for the additional tool assembly coding element 316, 318, 320, 322 to be configured as a depression, such as a depression produced by an embossing method, for example, on the clamping wing 19 and/or on the support flange 14, as is illustrated in exemplary manner in FIGS. 15a and 15b. The support flange 14 can be configured so as to be integral to the operating region 15 or be connected in a form-fitting and/or force-fitting manner to the operating region 15 by means of a fastening element of the support flange 14, said fastening element being in particular produced by an embossing method (cf. FIGS. 15a and 15b).

A maximum diameter $d_w$ of the at least one additional tool assembly coding element 316, 318, 320, 322 preferably corresponds to a value from a value range from 0.8 mm to 1.6 mm. The at least one additional tool assembly coding element 316, 318, 320, 322 is preferably disposed in a radial region between the first delimitation circle 23 and the second delimitation circle 27 on the clamping wing 19. However, it is also conceivable for the at least one additional tool assembly coding element 316, 318, 320, 322 to be disposed in another region of the tool device 11. The tool device 11 advantageously comprises a multiplicity of additional tool assembly coding elements 316, 318, 320, 322 which are preferably disposed so as to be uniformly distributed on the tool device 11, in particular on the support flange 14 of the tool device 11. The additional tool assembly coding elements 316, 318, 320, 322 are in particular disposed on a common annulus 326 which has a maximum diameter having a value from a value range from 23 mm to 28 mm. The common annulus preferably has a center that is disposed on the tool rotation axis a.

Figure 6:
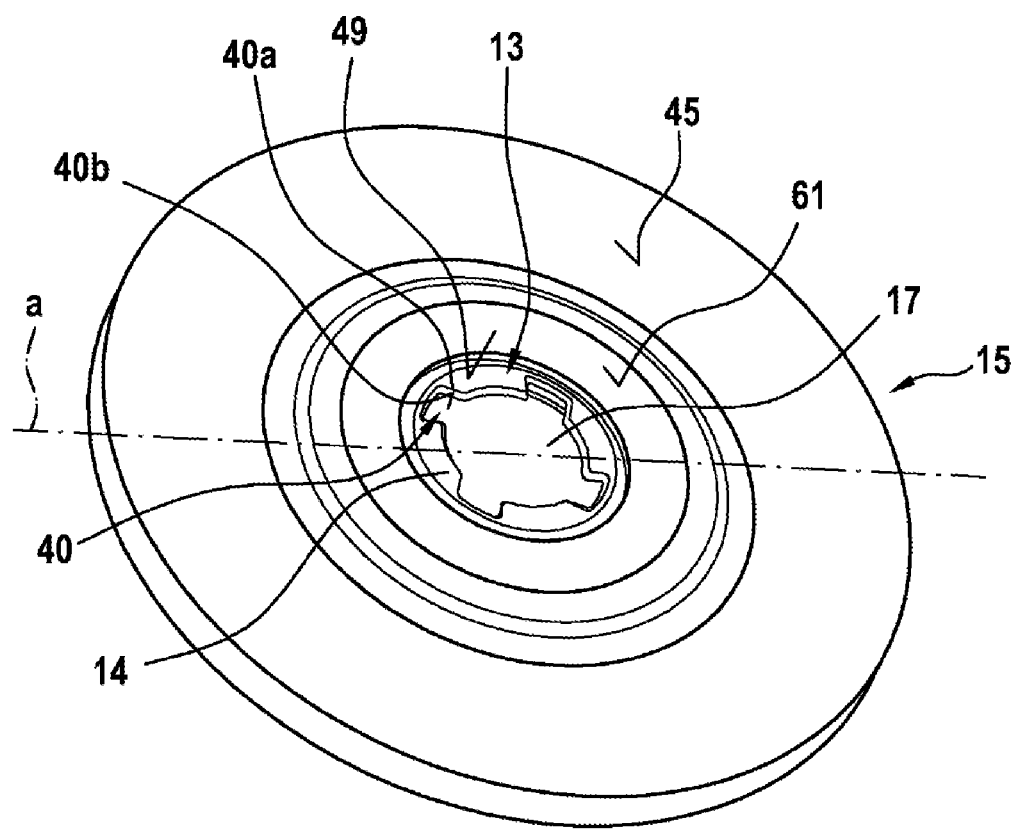
FIG. 6 shows a perspective view of a third embodiment of a tool device according to the disclosure.
Figure 7:
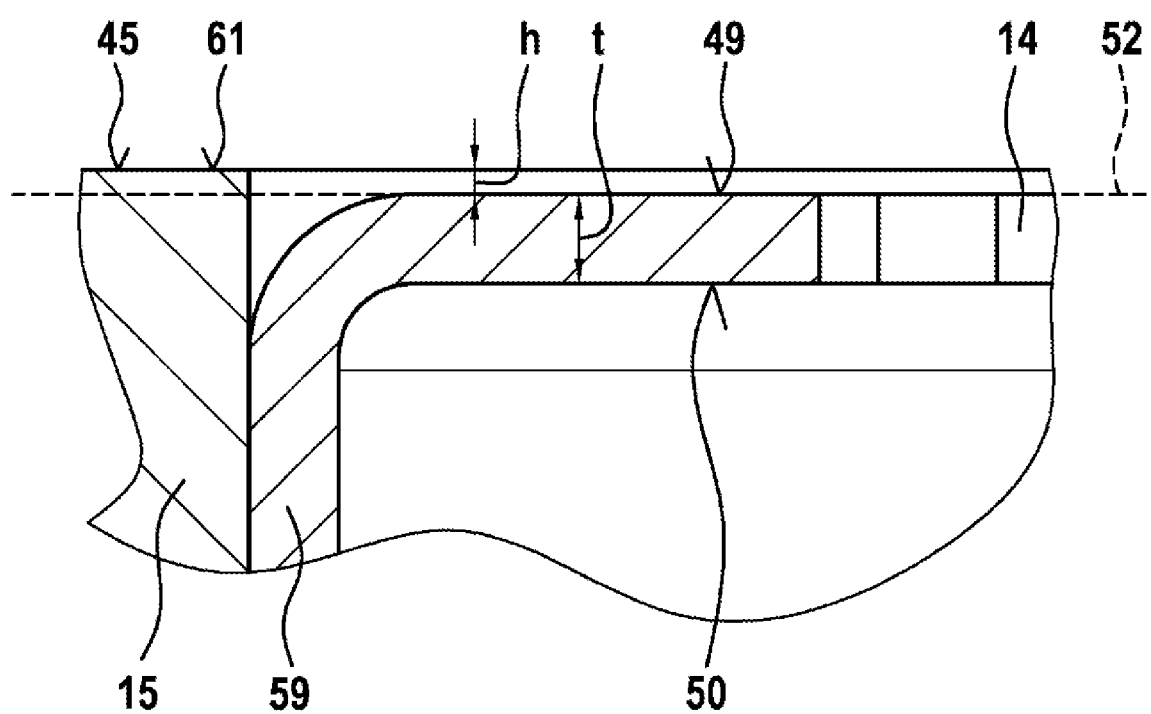
FIG. 7 shows an enlarged sectional view A-A of the tool device from FIG. 6.

FIGS. 6 to 8 show a further embodiment of the tool device 11. The support flange 14 herein is embodied so as to be angulated in the axial direction such that the support flange 14 is substantially pot-shaped. The support flange 14 has a substantially cylindrical sidewall 59 which extends in the axial direction and delimits the operating region 15 in the radial direction to the tool rotation axis a. The sidewall 59 has a substantially circular cross section. In an alternative embodiment, the sidewall 59 can have a cross section having variable spaces of the sidewall 59 from the tool rotation axis a of a plane orthogonal to said tool rotation axis. The sidewall 59 is substantially concentric with the first delimitation circle 23 and the second delimitation circle 27. The sidewall 59 delimits a minimum radial extent of the operating region 15 and effects in particular a form-fitting connection of the operating region 15 in the radial direction of the tool rotation axis a. Additionally, the sidewall 59 can also effect a force-fitting connection between the sidewall 59 and the operating region 15 in the axial direction of the tool rotation axis a. The sidewall 59 runs so as to be radially spaced apart from the tool rotation axis a. The sidewall 59 extends between the first upper support plane 52 and the second lower support plane 54. The sidewall 59 encircles so as to be substantially radially closed about the tool rotation axis a The first support face 51 in this embodiment is spaced apart to the first connector face 49 in the radial direction and to the tool rotation axis a in the axial direction.

The first support plane 52 extends along the first connector face 49. The second support plane 54 extends along the second support face 53.

The torque-receiving region 40 extends in the axial direction between the first connector face 49 and a second connector face 50 of the support flange 14 that is opposite the first connector face 49 and faces away therefrom.

The operating region 15 is connected to the support flange 14 in such a manner that the operating region 15 in relation to the support flange 14 along the tool rotation axis a in a direction facing the tool receptacle device 213 of the hand-held power tool 211 projects at a height h of up to 0.6 mm, as is derived also from FIG. 5, for example. The first lateral face 45 herein has a lateral face region which forms a contact face 61 and which is provided for bearing on the tool receptacle device 213 of a hand-held power tool 211. The contact face 61 of the operating region 15 in the axial direction of the tool rotation axis a preferably projects in relation to the connector face 49 in a manner corresponding to the height h.

Figure 8A:
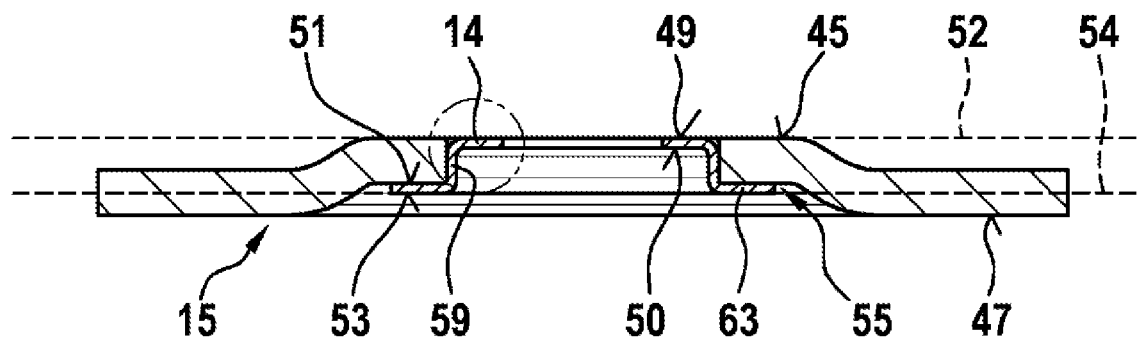
FIG. 8a shows a sectional view A-A of the tool device from FIG. 6.

A sectional view of the tool device 11 is furthermore shown in FIG. 8a, such that a support lip which extends from the sidewall 59 in the radial direction of the tool rotation axis a and is configured as a securing means 63 has, and which is provided for connecting the operating region 15 to the support flange 14 and for forming the connection region 55 between operating region 15 and support flange 14.

Figure 8B:
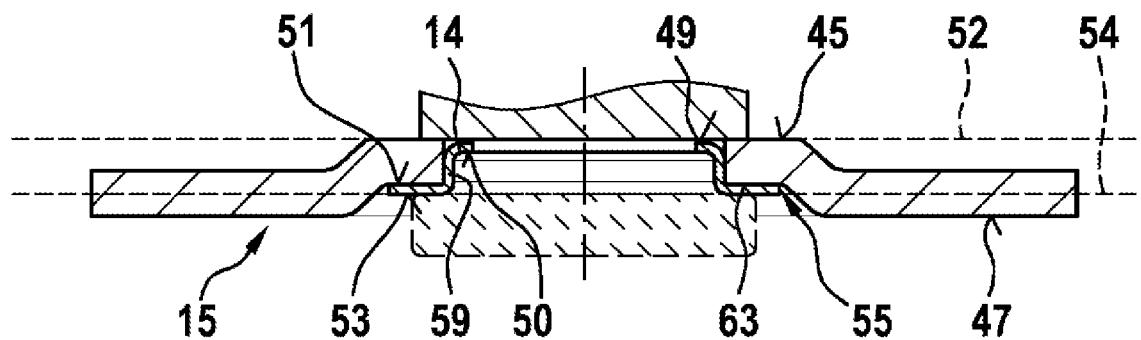
FIG. 8b shows a sectional view A-A of the tool device from FIG. 6 having a conventional tool receptacle device of a hand-held power tool.

An exemplary receptacle of the tool device 11 in an alternative tool receptacle device of an alternative hand-held power tool having an output shaft of the alternative hand-held power tool is illustrated in FIG. 8b, said exemplary receptacle contacting the contact face 61 of the operating region 55, and having a schematically illustrated tensioning nut which contacts the support lip 63 of the support flange 14 and tensions or fastens, respectively, the tool device 11 in the axial direction of the tool rotation axis a.

Figure 9:
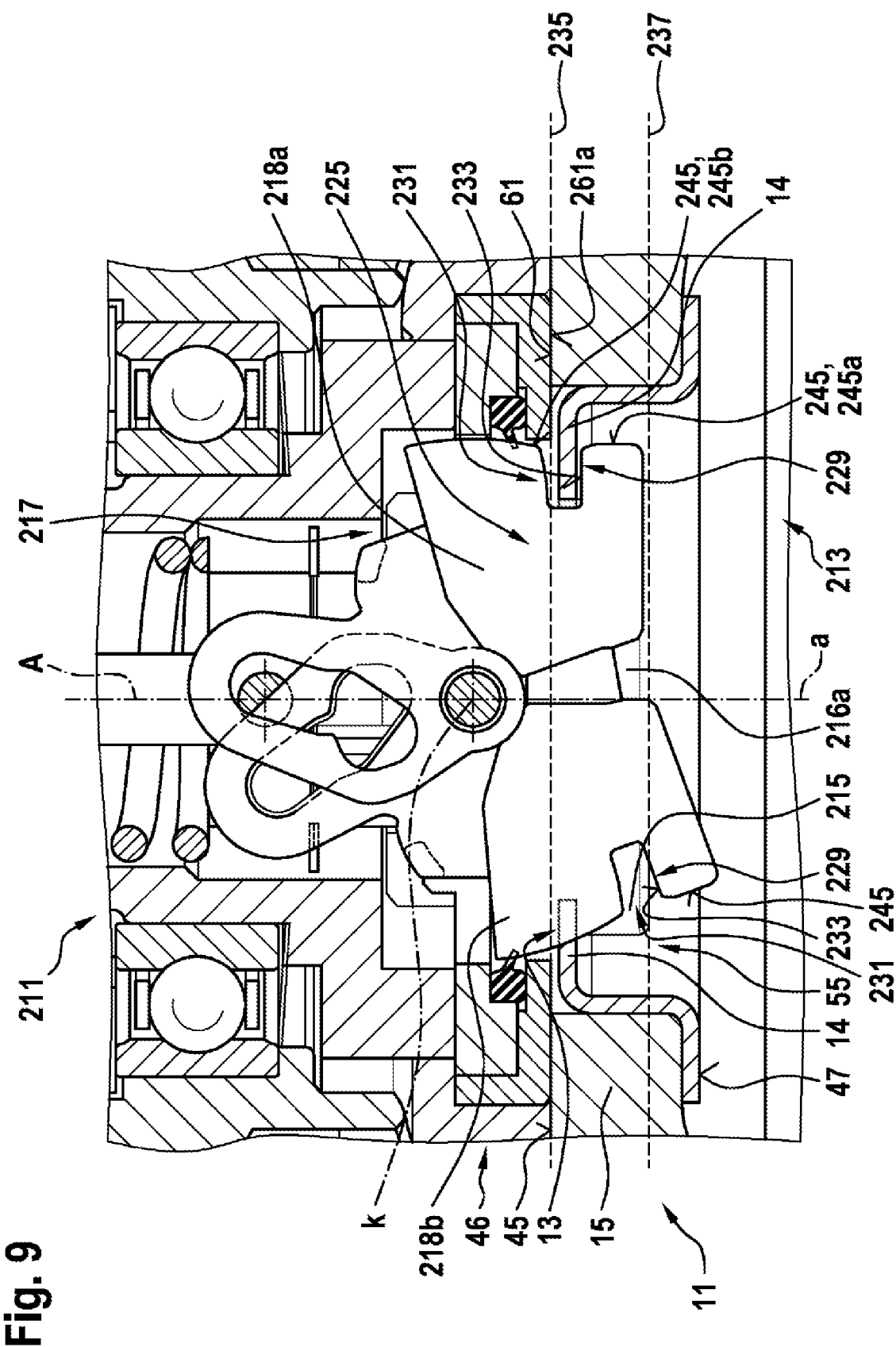
FIG. 9 shows a section through a power tool system having a hand-held power tool and having a tool device from FIG. 6 which is disposed on a tool receptacle device of the hand-held power tool.

FIG. 9 shows a power tool system, or a machining system, respectively, having a tool receptacle device 213 of a hand-held power tool 211 that is capable of being rotatably moved about an output axis A, and a tool device 11. The tool device 11 is received on the tool receptacle device 213 such that the output axis A and the, in particular fictitious, geometric tool rotation axis a coincide.

The tool receptacle device 213 is specified for holding a tool device 11 on the hand-held power tool 211 in such a manner that the output axis A and the tool rotation axis a substantially coincide.

The tool receptacle device 213 preferably has at least one entrainment device 215 and a clamping device 217 that is capable of being moved relative to the entrainment device 215.

The clamping device 217 has two hook jaws 218a, 218b which are configured as hook devices 218 and which are mounted so as to be rotatable relative to one another about a clamping device rotation axis k of the clamping device 217.

The entrainment device 215 for transmitting a drive force to the tool device 11 has four torque-transmitting regions 219 that are disposed at a spacing from said output axis A. The torque-transmitting regions 219 can in each case be configured as an output face 219b, in particular an output face region, or as an output edge 219a, in particular an output edge region.

Figure 10A:
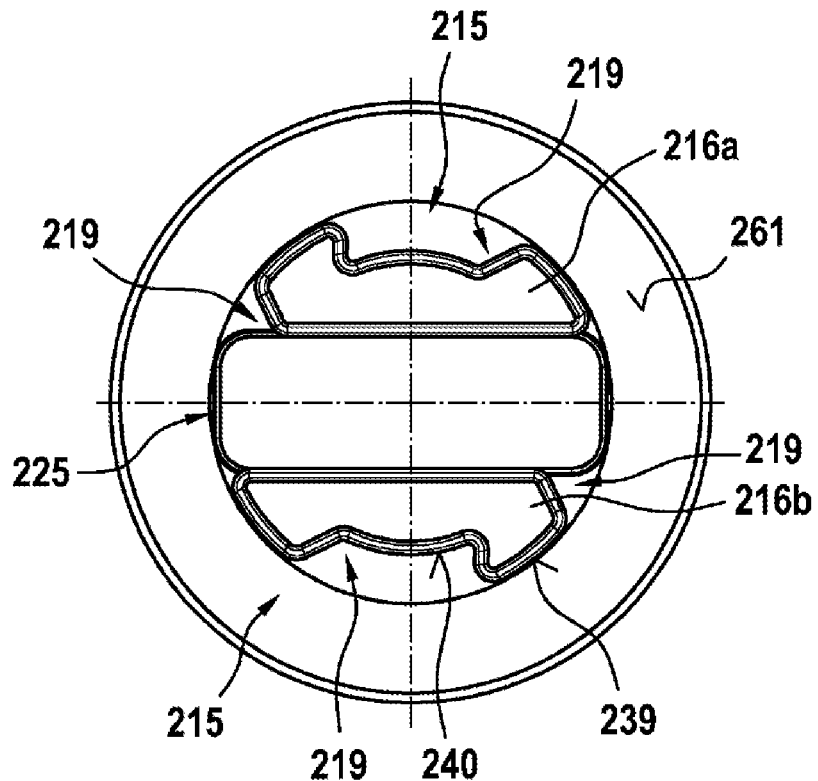
FIG. 10a shows a view of part of the tool receptacle device from FIG. 9.
Figure 10B:
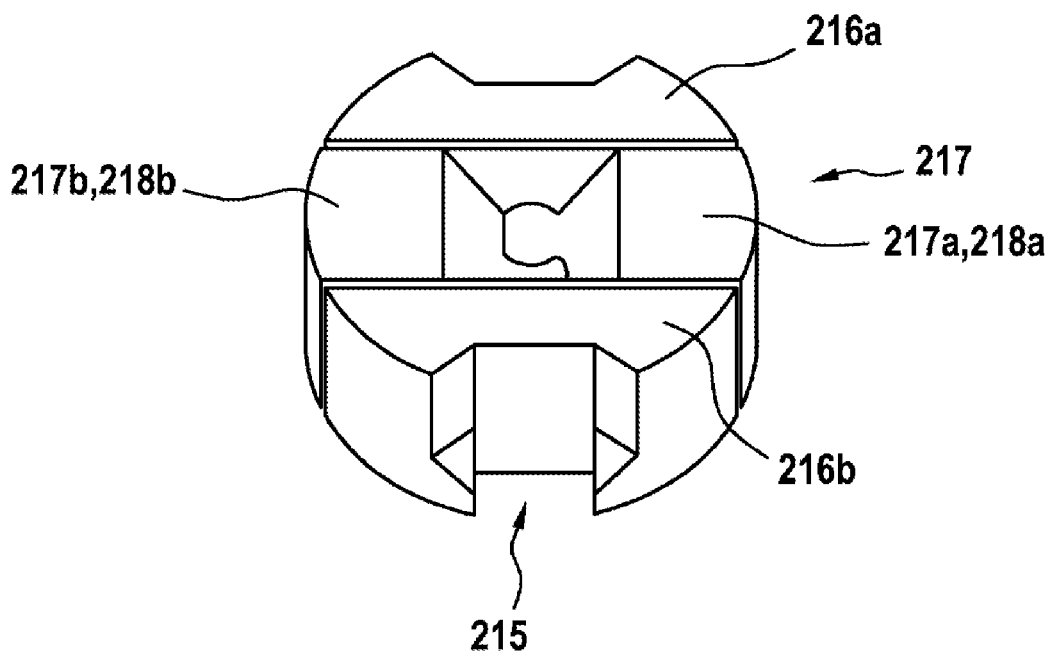
FIG. 10b shows a view of part of a first alternative tool receptacle device.
Figure 10C:
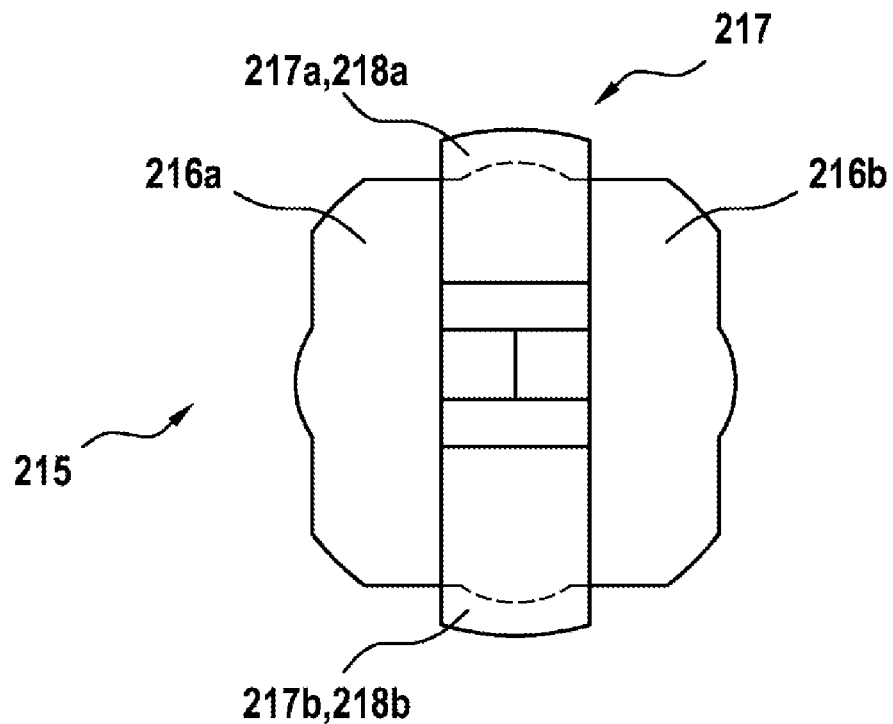
FIG. 10c shows a view of part of a second alternative tool receptacle device.
Figure 10D:
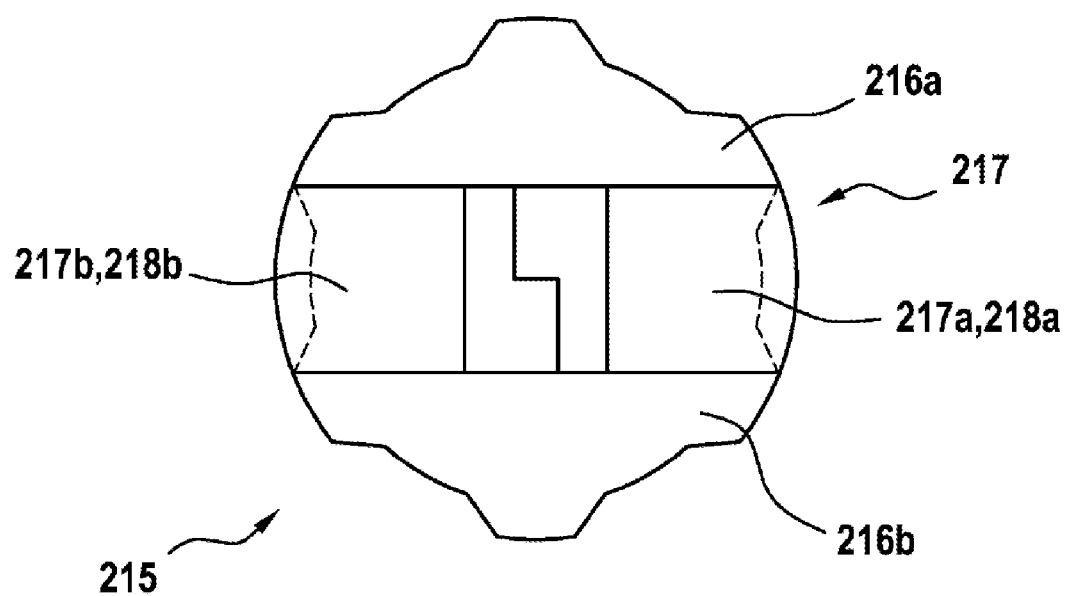
FIG. 10d shows a view of part of the third alternative tool receptacle device.
Figure 11:
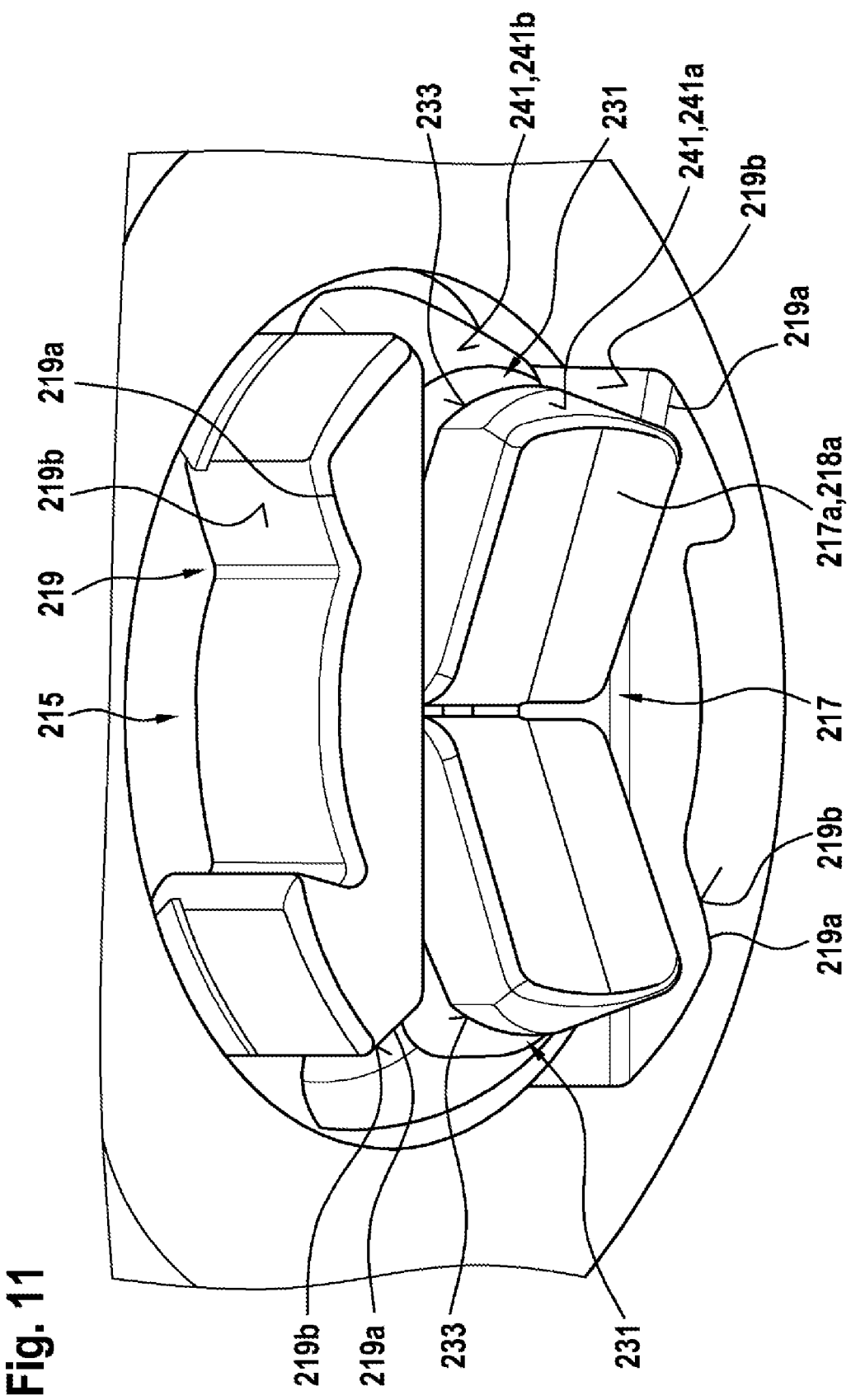
FIG. 11 shows a perspective view of the tool receptacle device of the hand-held power tool from FIG. 9.

The entrainment device 215 and the clamping device 217 shown in FIGS. 10 and 11 are provided for engaging through a clearance 17 of the tool device 11 that extends through the entire material thickness of the tool device 11 and for clamping the tool device 11 to the tool receptacle device 213 by means of the hook device 218 that is movable substantially in the radial direction to the output axis A.

The tool receptacle device 213 has a substantially rectangular opening 225 which is provided for receiving the hook device 218. The two hook devices 218 have in each case at least one clamping face 233 for transmitting an at least axial force action to the tool device 11.

The entrainment device 215 is configured by two entrainment jaws 216a, 216b which serve in particular as guide jaws and which are provided for guiding the clamping device 217 of the tool receptacle device 213 in the radial direction in that a movement of the clamping device 217 in the radial direction of the output axis A about the clamping device rotation axis k is enabled and is delimited perpendicularly to said radial direction. The entrainment jaws 216a, 216b delimit the opening 225 in the radial direction of the tool rotation axis a along the longitudinal extent of the substantially rectangular opening 225.

The entrainment device 215 has a maximum radial extent which is larger than a maximum radial extent of the clamping device 217 in a fastening state, on account of which the entrainment jaws 216a, 216b in the case of a rotating drive of the tool receptacle device 213 projecting in the radial direction of the output axis A guaranteed a protection of the hook jaws 218a, 218b in that the hook device 218 in the event of an accidental contact with a workpiece is protected by the entrainment device 215.

The hook jaws 218a, 218b in FIG. 9 for improved illustration are disposed in a fictitious state, specifically in a fastening state (right hook jaw 218a) and in a releasing state (left hook jaw 218b). Said fictitious state of the hook jaws 218a, 218b is preferably not achievable in the case of the hand-held power tool 211 according to the disclosure, since both hook jaws 218a, 218b are disposed either in the fastening state or in the releasing state. The hook jaws 218a, 218b are preferably mounted so as to be movable in a synchronous manner.

The hook jaws 218a, 218b in a releasing state of the clamping device 217 project in relation to the entrainment device 215 in the axial direction to the output axis A, such as can be seen for example on the left hook jaw 218a in FIG. 9. It can be seen that the hook jaws 218a, 218b in a releasing state of the tool receptacle device 213 in the axial direction to the output axis A project further in relation to the entrainment device 215 than in a fastening state.

The hook jaws 218a, 218b of the clamping device 217 have in each case at least one circumferential face 245 which delimits a maximum radial extent of the hook jaws 218a, 218b. The circumferential faces 245 of the hook jaws 218a, 218b are oriented away from one another. The hook jaws 218a, 218b have in each case one first circumferential face 245a and one second circumferential face 245b, said circumferential faces 245a, 245b in the axial direction being separated by a clamping clearance 231 of the clamping device 217. The first and the second circumferential face 245a, 245b delimit a radial extent of the clamping clearance 231. The first circumferential face 245a is curved at least about the output axis A.

For improved visualization, the right hook jaw 218b from FIG. 9 is embodied in a fastening state in which the hook jaw 218b holds the tool device 11 on the tool receptacle device 213. The hook devices 218 are surrounded by the bearing face 261.

The torque-transmitting region 219 of the entrainment device 217 has an output face 219b, in particular an output face region, and an output edge 219a, in particular an output edge region. At least the output face region of the output face 219b can be planar. At least the output edge region of the output edge 219a can be rectilinear.

The output faces 219b and the output edges 219a are angled in relation to a plane defined by an axial direction and a radial direction of the output axis A and in particular angled, preferably by up to 30°, counter to a rotation direction of the tool receptacle device 213 in the operation of the hand-held power tool 211. The tool receptacle device 213 furthermore has a planar circular-ring-shaped bearing face 261 which is provided for supporting at least the contact face 61 of the tool device 11 in the axial direction. The bearing face 261 in the radial direction is spaced apart from the hook device 218, in particular from the clamping face 233 of the clamping device 217.

The operating region 15 of the tool device 11 is disposed on the connector device 13 in such a manner that the operating region 15 in a fastening state in relation to the connector device 13 along the tool rotation axis a projects in a direction that faces the tool receptacle device 213 of the hand-held power tool 211. Wherein the contact face 61 of the operating region 15 in a fastening state of the tool device 11 is in contact with the bearing face 261 of the hand-held power tool 211 and forms a force-fitting connection in the circumferential direction of the tool rotation axis a to the hand-held power tool 11.

The bearing face 261 in the radial direction of the tool rotation axis a extends between a first radial spacing and a second radial spacing, wherein the first radial spacing is smaller than the second radial spacing.

The clamping wing 19, or the first delimitation edge 21 of the clamping wing 19, respectively, of the tool device 11 in a fastening state of the tool device 11 to the hand-held power tool 211 in relation to the first, in particular minimum, radial spacing of the bearing face 261 projects by up to 4 mm in the radial direction to the output axis A such that no bearing face 261, or no supporting material, respectively, is present in this region and can bend the clamping wing 19 in the axial direction.

The tool receptacle device 213, in particular the hook device 218, has an activation device 229 which in the event of an axial activation of the activation device 229 by means of an activation force is provided for transferring the hook device 218 from a releasing state in which the tool device 11 is capable of being removed from the tool receptacle device 213 or being placed thereon, to a fastening state in which the tool device 11 is connected to the tool receptacle device 213.

The hook device 218 furthermore has the radial clamping clearance 231 which is provided for receiving the at least one clamping wing 19 and in a fastening state for clamping said clamping wing 19 in the axial direction of the output axis A and for releasing in a releasing state said clamping wing 19. The clamping clearance 231 has the clamping face 233 which is provided for applying a clamping effect to the tool device 11.

The hook devices 218 are mounted so as to be pivotable about the clamping device rotation axis k that is in particular substantially orthogonal to the output axis A in such a manner that tool devices 11 of dissimilar thicknesses of the connector devices 13 are capable of being chucked by means of the hook device 218 by way of the hook device 218 depending on a pivot angle, inclined in relation to the output axis A, of the hook device 218, in particular of the clamping face 233 of the hook device 218.

The torque-transmitting regions 219 of the tool receptacle device 213 lie between a first orthogonal plane 235 and a second orthogonal plane 237 of the tool receptacle device 213 when the tool device 11 is fastened to the hand-held power tool 211. The tool receptacle device 213 has two entrainment jaws 216a, 216b having in each case two torque-transmitting regions 219 which are disposed so as to be mutually rotationally symmetrical about the output axis A.

The first orthogonal plane 235 delimits the tool receptacle device 213 in the direction of the output axis A on that side that faces the hand-held power tool 211; the second orthogonal plane 237 delimits the tool receptacle device 213 on that side that faces away from the hand-held power tool 211.

The torque-transmitting regions 219 in the radial direction of the output axis A extend at least in portions between a first and a second radial spacing from the output axis A, and wherein at least one of said portions is specified for the torque transmission 219 from the hand-held power tool 211 to the tool device 11.

Preferably, a torque-transmitting region 219, more preferably a plurality of, particular preferably all, torque-transmitting regions 219 of the hand-held power tool 211 contacts the torque-receiving regions 40 of the tool device 11 at least in portions in the form of a punctiform contact, preferably in the form of a linear contact, and particularly preferably in the form of a planar contact.

FIGS. 10b, 10c and 10d show alternative design embodiments of the tool receptacle device 213 of the hand-held power tool 211 for receiving tool devices which have a symmetrical design embodiment of a connector device. The tool receptacle devices 213 illustrated in FIGS. 10b, 10c and 10d have a design embodiment that is at least substantially analogous to that of the tool receptacle device 213 illustrated in the preceding figures. By contrast to the tool receptacle device 213 illustrated in the preceding figures, the tool receptacle devices 213 illustrated in FIGS. 10b, 10c and 10d have an entrainment device 215 that is configured so as to be symmetrical to a plane of symmetry that runs at least substantially parallel with the output axis A. The output axis A preferably runs in the plane of symmetry in relation to which the entrainment device 215 is configured so as to be symmetrical.

The entrainment device 215 illustrated in FIG. 10b preferably has entrainment jaws 216a, 216b which are configured so as to be mutually symmetrical. The entrainment jaws 216a, 216b are in particular configured so as to be mutually mirror-symmetrical, in particular in relation to a plane of symmetry that comprises the output axis A. The entrainment jaws 216a, 216b are in each case preferably configured so as to be mirror-symmetrical in relation to a plane that extends so as to be at least substantially perpendicular to the plane of symmetry.

At least one introduction clearance of the entrainment device 215 is preferably disposed on each of the entrainment jaws 216a, 216b, in which a clamping wing, which has in particular a rectangular cross section, of a tool device (not illustrated in more detail) that is configured so as to correspond to the tool receptacle device 213 from FIG. 10b can be introduced and/or disposed. The entrainment jaws 216a, 216b have in particular in each case at least one introduction ramp. The introduction ramp is disposed on the respective entrainment jaw 216a, 216b on an external face of the respective entrainment jaw 216a, 216b that at least in part delimits the introduction clearance.

The entrainment device 215 illustrated in FIG. 10c preferably has entrainment jaws 216a, 216b that are configured so as to be mutually symmetrical. The entrainment jaws 216a, 216b are in particular configured so as to be mutually mirror-symmetrical, in particular in relation to a plane of symmetry that comprises the output axis A. The entrainment jaws 216a, 216b are in each case preferably configured so as to be mirror-symmetrical in relation to a plane that extends so as to be at least substantially perpendicular to the plane of symmetry. The entrainment jaws 216a, 216b have in each case a rectangular basic shape having at least two chamfered edges. The entrainment jaws 216a, 216b on an external side of the respective entrainment jaw 216a, 216b that connects the two chamfered edges to one another comprise in each case an appendage. The appendage of the respective entrainment jaw 216a, 216b is preferably configured so as to be circle-segment-shaped. The appendage of the respective entrainment jaw 216a, 216b can form an assembly coding element of the tool receptacle device 213 illustrated in FIG. 10c, for example. An internal face of the clamping device 217 that runs so as to be at least substantially perpendicular to a clamping face 233 of a clamping device 217 of the tool receptacle device 213 illustrated in FIG. 10c preferably has a circle-segment-shaped appendage. The appendage of the clamping device 217 can form, for example, a fastening coding element of the tool receptacle device 213 illustrated in FIG. 10c. Preferably, a fastening of a tool device (not illustrated in more detail here) which has a clearance that does not correspond to the appendage of the clamping device 217 is advantageously largely avoidable by means of the clamping device 217 of the tool receptacle device 213 illustrated in FIG. 10c. Appendages of the entrainment jaws 216a, 216b, and appendages of the clamping device 217 in a plane that runs so as to be at least substantially perpendicular to the output axis A preferably form a quartic circumferential contour of the tool receptacle device 213.

The entrainment device 215 illustrated in FIG. 10d preferably has entrainment jaws 216a, 216b that are configured so as to be mutually symmetrical. The entrainment jaws 216a, 216b are in particular configured so as to be mutually mirror-symmetrical, in particular in relation to a plane of symmetry that comprises the output axis A. The entrainment jaws 216a, 216b are preferably in each case configured so as to be mirror-symmetrical in relation to a plane that extends so as to be at least substantially perpendicular to the plane of symmetry. Each entrainment jaw 216a, 216b preferably has at least two entrainment contours and/or coding contours that are configured so as to correspond to clamping wings of a tool device (not illustrated in more detail). The entrainment contours and/or coding contours are preferably configured as depressions in an external contour of the entrainment device 215, in particular when viewed in a plane that runs so as to be at least substantially perpendicular to the output axis A. A clamping device 217 of the tool receptacle device 213 illustrated in FIG. 10d comprises an internal face of the clamping device 217 that runs so as to be at least substantially perpendicular to a clamping face 233 of the clamping device 217. The internal face, when viewed in the plane that runs so as to be at least substantially perpendicular to the output axis A, has a profile that is analogous to one of the entrainment contours and/or coding contours. The entrainment contours and/or coding contours of the entrainment jaws 216a, 216b and internal faces of the clamping device 217 in the plane that runs so as to be at least substantially perpendicular to the output axis A preferably form a hexad circumferential contour of the tool receptacle device 213.

Figure 12:
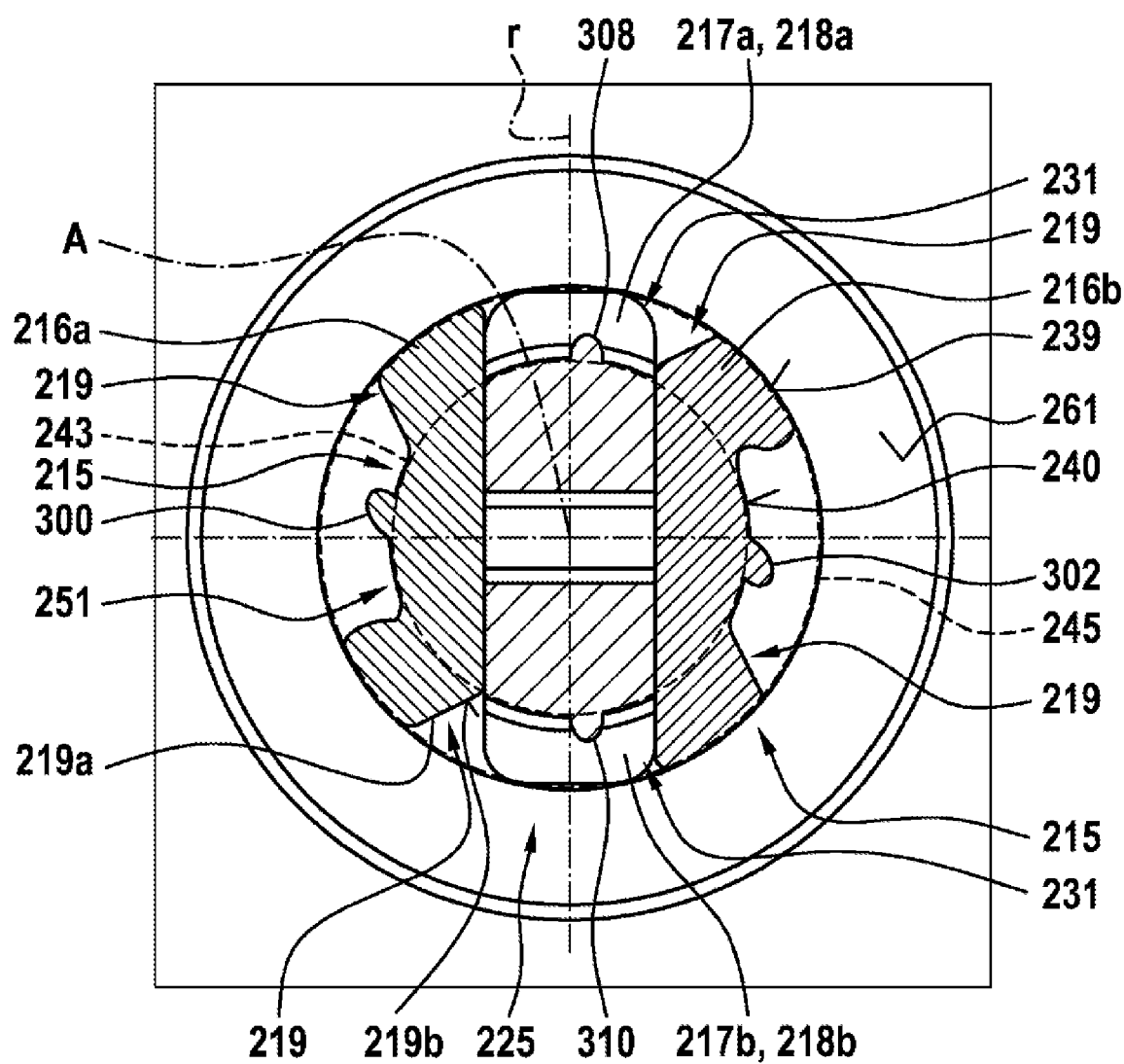
FIG. 12 shows a sectional view of the tool receptacle device along a first orthogonal plane from FIG. 9.
Figure 13:
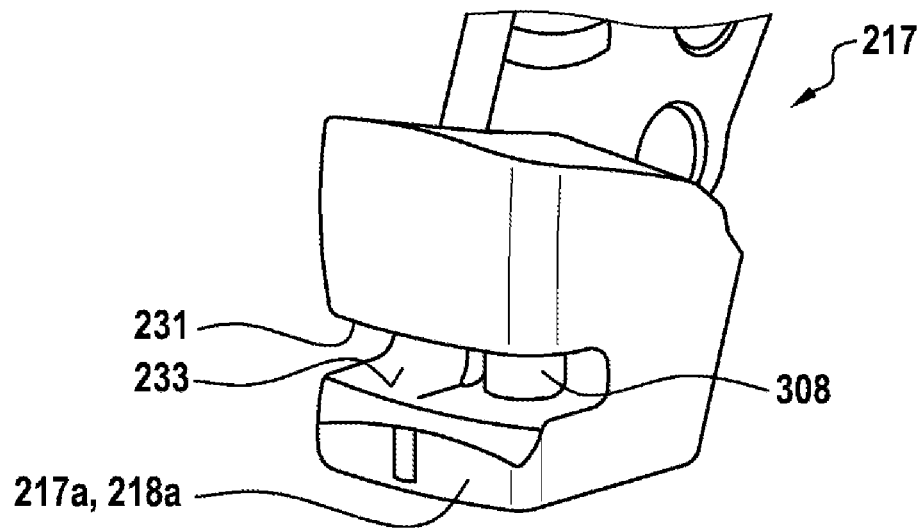
FIG. 13 shows a detailed view of a hook jaw of the tool receptacle device from FIG. 9, having an assembly coding element of a clamping device of the tool receptacle device being disposed thereon.

FIGS. 13 to 15 show views of additional details of the power tool system, in particular of the tool device 11 and of the tool receptacle device 213 of the hand-held power tool 211, wherein the details additionally shown in FIGS. 13 to 15 have not been illustrated in the preceding FIGS. 1 to 12 for the sake of clarity, so as to enable simple legibility of FIGS. 1 to 12. The features disclosed in the context of FIGS. 13 to 15 can be transferred in analogous manner to FIGS. 1 to 12.

The tool device 11 comprises at least one tool assembly coding element 304, 306, 312, 314 which in a state of the tool device 11 disposed on the tool receptacle device 213 is provided for interacting with at least one assembly coding element 300, 302, 308, 310 of the tool receptacle device 213 (cf. FIG. 12). The at least one tool assembly coding element 304, 306, 312, 314 of the tool device 11, and the at least one assembly coding element 300, 302, 308, 310 of the tool receptacle device 213 are in particular configured in a corresponding manner.

The at least one assembly coding element 300, 302, 308, 310 of the tool receptacle device 213 is preferably provided for coding a disposal, a fixing, or a placement of the tool device 11 on or onto the tool receptacle device 213, in particular the bearing face 261. The at least one assembly coding element 300, 302, 308, 310 of the tool receptacle device 213 is preferably provided for coding a disposal, a fixing, or a placement of the tool device 11 on or onto the tool receptacle device 213, in particular the bearing face 261, according to a key/keyhole principle.

The entrainment device 215 comprises at least one assembly coding element 300, 302 which in a state of the tool device 11 disposed on the tool receptacle device 213 is provided for interacting with at least one tool assembly coding element 304, 306 of the tool device 11. The at least one assembly coding element 300, 302 of the entrainment device 215 is disposed on at least one entrainment jaw 216a, 216b of the entrainment device 215 (cf. FIG. 12).

The at least one assembly coding element 300, 302 of the entrainment device 215 is configured as a mechanical assembly coding element. The at least one assembly coding element 300, 302 of the entrainment device 215 is configured so as to be integral to the entrainment jaw 216a, 216b. The at least one assembly coding element 300, 302 of the entrainment device 215 is configured as an appendage. However, it is also conceivable, for the at least one assembly coding element 300, 302 of the entrainment device 215 to have another design embodiment that is considered expedient by a person skilled in the art, such as, for example, a design embodiment as a clearance, as a web, or the like. The at least one assembly coding element 300, 302 of the entrainment device 215 preferably extends at least along a direction that runs so as to be transverse, at least substantially perpendicular, to the tool rotation axis a of the tool device 11. The at least one assembly coding element 300, 302 of the entrainment device 215 is disposed so as to be contiguous to an internal circumferential face 240 of the at least one entrainment jaw 216a, 216b. The at least one assembly coding element 300, 302 of the entrainment device 215, proceeding from the internal circumferential face 240 of the at least one entrainment jaw 216a, 16b, extends in particular in a direction that is oriented away from the tool rotation axis a, in particular up to at most the circumferential face 245 which is delimited from the external circumferential circle 245c (cf. FIGS. 9 and 12).

The at least one assembly coding element 300, 302 of the entrainment device 215, when viewed along a circumferential direction, is preferably disposed between the drive edge 219a and/or the drive face 219b and a side of the entrainment jaw 216a, 216b that faces away from the drive edge 219a and/or the drive face 219b. The at least one assembly coding element 300, 302 of the entrainment device 215 along the circumferential direction preferably has a maximum extent which is smaller than a maximum spacing along the circumferential direction between the drive edge 219a and/or the drive face 219b and the side of the entrainment jaw 216a, 216b that faces away from the drive edge 219a and/or the drive face 219b. The at least one assembly coding element 300, 302 of the entrainment device 215 is preferably disposed in an angular range of less than 60° between the drive edge 219a and/or the drive face 219b and the side of the entrainment jaw 216a, 216b that faces away from the drive edge 219a and/or the drive face 219b.

The at least one assembly coding element 300, 302 of the entrainment device 215 can have any design embodiments that are considered expedient by a person skilled in the art. For example, it is conceivable for the at least one assembly coding element 300, 302 of the entrainment device 215, in particular when viewed in the first orthogonal plane 235, to have a polygonal (square, cuboid, triangular, n-cornered, or the like) or a circular (semicircular, semicircular having an undulated external circumferential line, or the like) cross section, as this in an exemplary manner can also be derived from FIG. 14, since the at least one tool assembly coding element 304, 306, 312, 314 of the tool device 11 is preferably configured so as to correspond to the at least one assembly coding element 300, 302, 308, 310 of the tool receptacle device 213. However, it is also conceivable for the at least one tool assembly coding element 304, 306, 312, 314 of the tool device 11 and the at least one assembly coding element 300, 302, 308, 310 of the tool receptacle device 213 to be dissimilarly configured, in particular in terms of a size measurement. For example, it is conceivable for the at least one tool assembly coding element 304, 306, 312, 314 of the tool device 11 along a circumferential direction or along a radial direction to have a maximum extent which corresponds to a multiple of a maximum extent of the at least one assembly coding element 300, 302, 308, 310 of the tool receptacle device 213, or the like.

At least one assembly coding element 300, 302 is preferably disposed at least on each entrainment jaw 216a, 216b of the entrainment device 215 (cf. FIG. 12). However, it is also conceivable for more than one assembly coding element 300, 302 to be provided per entrainment jaw 216a, 216b, such as, for example, at least two, at least three, at least four, or a plurality of assembly coding elements 300, 302 per entrainment jaw 216a, 216b. The assembly coding elements 300, 302 that are disposed on the entrainment jaws 216a, 216b have in particular a mutually analogous design embodiment, wherein a dissimilar design embodiment of the assembly coding elements 300, 302 are also conceivable.

The assembly coding elements 300, 302 of the entrainment device 215 that are disposed on the entrainment jaws 216a, 216b are preferably disposed on the entrainment jaws 216a, 216b so as to be asymmetrical in relation to a plane that comprises the output axis A. However, it is also conceivable for the assembly coding elements 300, 302 of the entrainment device 215 that are disposed the entrainment jaws 216a, 216b to be disposed on the entrainment jaws 216a, 216b so as to be symmetrical in relation to a plane that comprises the output axis A, such as can in particular be derived in an exemplary manner by way of the potential corresponding disposals of the tool assembly coding elements 304, 306, 312, 314 from FIG. 14.

The clamping device 217, in particular at least the hook device 217a, 217b of the clamping device 217, comprises at least one assembly coding element 308, 310 (cf. FIGS. 12 and 13). The assembly coding element 308, 310 of the clamping device 217 is preferably disposed on the hook jaw 218a, 218b, in particular in the clamping clearance 231 of the hook jaw 218a, 218b. The clamping device 217 preferably comprises a multiplicity of assembly coding elements 308, 310, in particular at least two. However, it is also conceivable for the clamping device 217 to have a number of assembly coding elements 308, 310 that are disposed on the hook device 217a, 217b said number deviating from one and two. The at least one assembly coding element 308, 310 of the clamping device 217 preferably forms a fixing coding element which is provided for coding a fastening of the tool device 11 to the tool receptacle device 213. The at least one assembly coding element 308, 310 of the clamping device 217 is preferably provided for coding a fastening of the tool device 11 to the tool receptacle device 217 according to a key/keyhole principle.

The at least one assembly coding element 308, 310 of the clamping device 217 is preferably configured so as to be integral to the hook jaw 218a, 218b. However, it is also conceivable for the at least one assembly coding element 308, 310 of the clamping device 217 to be configured so as to be separate from the hook jaw 218a, 218b and to be fixed to the hook jaw 218a, 218b by means of a connection that is considered expedient by a person skilled in the art. The at least one assembly coding element 308, 310 of the clamping device 217 is preferably disposed on the clamping face 233 of the clamping device 217, in particular so as to be directly contiguous to the clamping face 233 which at least in part delimits the clamping clearance 231. The at least one assembly coding element 308, 310 of the clamping device 217 has in particular a maximum extent within the clamping clearance 231 which is smaller than a maximum extent of the clamping face 233 of the clamping device 217. The at least one assembly coding element 308, 310 of the clamping device 217 is preferably configured as an appendage. However, it is also conceivable for the at least one assembly coding element 308, 310 of the clamping device 217 to have another design embodiment that is considered expedient by a person skilled in the art, such as for example, a design embodiment as a clearance, as a groove, as a web, as a jagged contour, or the like. The at least one assembly coding element 308, 310 of the clamping device 217 can be disposed on the hook jaw 218a, 218b so as to be symmetrical or asymmetrical in relation to a central plane, in particular to a plane of symmetry, of the hook jaw 218a, 218b, such as can in particular be derived in an exemplary manner by way of the potential corresponding disposals of the tool assembly coding elements 304, 306, 312, 314 from FIG. 14. The central plane, in particular the plane of symmetry, of the hook jaw 218a, 218b preferably runs so as to be at least substantially parallel with the output axis A and/or comprises the latter. A disposal of the at least one assembly coding element 308, 310 of the clamping device 217 on the hook jaw 218a, 218b that is spaced apart in relation to the central plane, in particular to the plane of symmetry, of the hook jaw 218a, 218b is also conceivable.

The connector device 13 of the tool device 11 has the at least one tool assembly coding element 304, 306, 312, 314 which in a state of the tool device 11 disposed on the tool receptacle device 213 is provided for interacting with the at least one assembly coding element 300, 302, 308, 310 of the tool receptacle device 213. The at least one tool assembly coding element 304, 306, 312, 314 is disposed on the at least one clamping wing 19 of the connector device 13 (cf. FIG. 14a). The at least one tool assembly coding element 304, 306, 312, 314 along a radial axis r has a maximum extent which at most corresponds to a maximum spacing between the first delimitation circle 23 and the second delimitation circle 27 of the connector device 13, such as can be derived in an exemplary manner from the different potential embodiments of the connector device 13 in FIG. 14a. The at least one tool assembly coding element 304, 306, 312, 314 is preferably disposed in an angular range between the drive edge 40a and the coding edge 35 of the connector device 13 on the clamping wing 19 of the connector device 13. The angular range has in particular a maximum extent of less than 90°, preferably of less than 60°, and particularly preferably of less than 40°. The at least one tool assembly coding element 304, 306, 312, 314 along a circumferential direction has a maximum extent which is preferably smaller than a maximum spacing between the drive edge 40a and the coding edge 35 of the connector device 13. The at least one tool assembly coding element 304, 306, 312, 314 extends in particular along a circumferential direction in a region between the drive edge 40a and the coding edge 35. The region between the drive edge 40a and the coding edge 35 is preferably disposed within the first delimitation circle 23 and the second delimitation circle 27 of the connector device 13. The region is preferably formed by a part-region of an annulus that is delimited by the first delimitation circle 23 and the second delimitation circle 27 of the connector device 13, such as can be derived in an exemplary manner from the different potential embodiments in the enumeration in the form of a table in FIG. 14a, wherein a combination of potential embodiments illustrated also is certainly conceivable. The connector device 13 preferably comprises a multiplicity of tool assembly coding elements 304, 306, 312, 314 which can be disposed on the connector device 13, in particular on the clamping wings 19, so as to be symmetrical, in particular according to a n-fold rotational symmetry, or non-symmetrical.

Figure 14A:
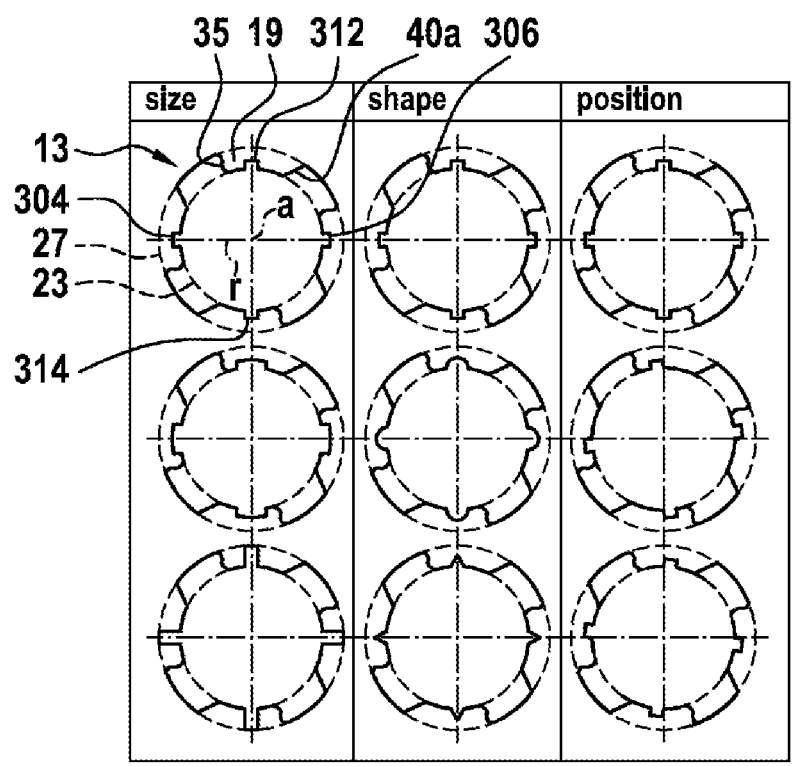
FIG. 14a shows an enumeration of potential disposals and design embodiments of tool assembly coding elements of the tool device in the form of a table.
Figure 14B:
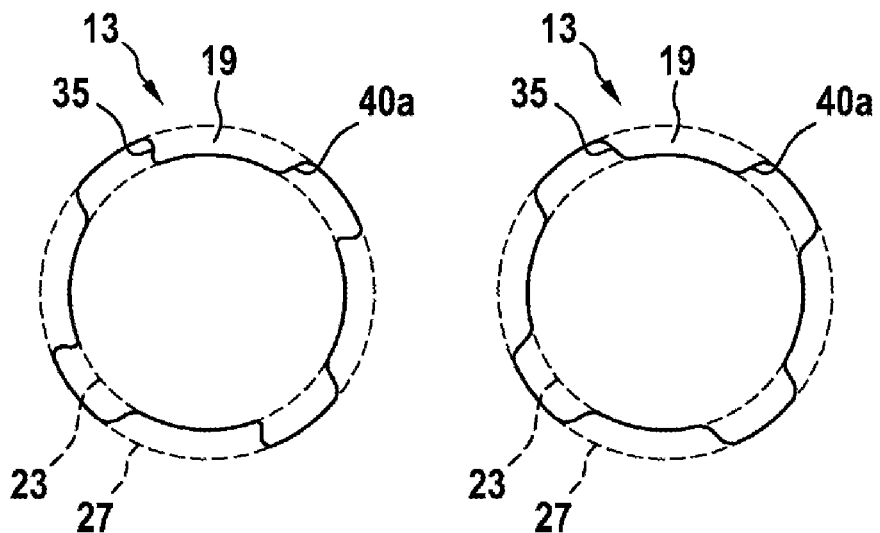
FIGS. 14b-14e show further potential design embodiments of the support flange of the tool device.

The enumeration of exemplary potential embodiments of the connector device 13, in particular in terms of potential embodiments of the tool assembly coding elements 304, 306, 312, 314 illustrated in the form of a table in FIG. 14a in a first column of the enumeration in the form of a table shows potential embodiments of the tool assembly coding elements 304, 306, 312, 314 in terms of a size, in particular a length, a width, or the like. A second column of the enumeration in the form of a table shows potential embodiments of the tool assembly coding elements 304, 306, 312, 314 in terms of a shape, such as, for example, a polygonal shape, a circular shape, or the like. A third column of the enumeration in the form of a table shows potential embodiments of the tool assembly coding elements 304, 306, 312, 314 in terms of a disposal relative to the radial axis r or to a plane that comprises the tool rotation axis a, such as, for example, a symmetrical disposal in relation to the radial axis r, a one-sided disposal in relation to the radial axis r, an n-fold rotational symmetry, or the like. The reference signs in FIG. 14a are indicated only for one potential embodiment so as to enable improved legibility of the enumeration in the form of a table. However, the potential embodiments of the connector device 13, in particular in terms of potential embodiments of the tool assembly coding elements 304, 306, 312, 314 illustrated in FIG. 14a herein is not to be seen as limiting, since the tool assembly coding elements 304, 306, 312, 314 can have further potential embodiments that are considered expedient by a person skilled in the art.

FIGS. 14b to 14e show alternative design embodiments of the connector device 13, in particular in terms of potential embodiments of the clamping wings 19. The connector device 13 in FIG. 14b preferably has a first delimitation circle 23 which at least in part delimits the clamping wing 19 of the connector device 13 and which has a maximum diameter D1 which is larger than a maximum diameter of a circle which delimits assembly coding elements 300, 302, 308, 310 of the tool device 11, in particular delimits in the direction of the radial axis r. The clamping wing 19 is preferably configured in such a manner that said clamping wing 19 in a state of the tool device 11 disposed on the tool receptacle device 231 extends into the clamping clearance 231 of the clamping device 217, and is in particular capable of being fastened to the tool receptacle device 213 by means of the clamping face 233. The clamping wing 19 is in particular configured in such a manner that an edge of the clamping wing 19, which delimits the clamping wing 19 along the radial axis r and is preferably at least in part disposed on the first delimitation circle 23, in a state of the tool device 11 disposed on the tool receptacle device 213, still just contacts the assembly coding element 300, 302, 308, 310 of the tool device 11, or is disposed so as to be spaced apart in relation to the assembly coding element 300, 302, 308, 310 of the tool device 11. The maximum diameter D1 of the first delimitation circle 23 is preferably smaller than a maximum diameter D2 of a second delimitation circle 27 of the connector device 13. The maximum diameter D1 of the first delimitation circle 23 is preferably larger than or equal to a maximum diameter of the circle which delimits the assembly coding elements 300, 302, 308, 310 of the tool device 11, in particular is larger than or equal to 24.8 mm. The clamping wing 19 can be configured so as to be mirror-symmetrical in relation to a plane of symmetry that comprises the tool rotation axis a (cf. right image in FIG. 14b) or can be configured so as to be non-symmetrical in relation to the plane of symmetry (cf. left image in FIG. 14b).

Figure 14C:
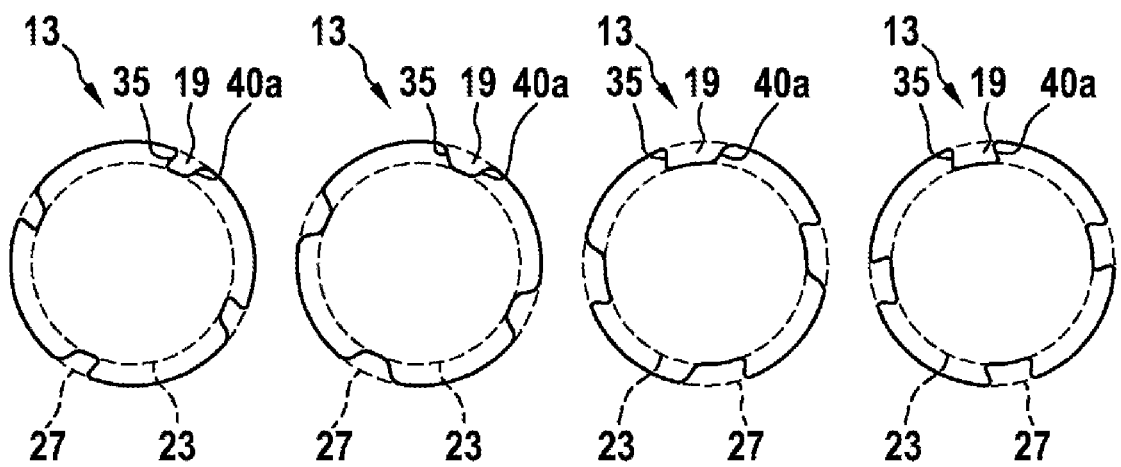

The connector device 13 in FIG. 14c preferably has at least one clamping wing 19, in particular at least four clamping wings 19, which along the first delimitation circle 23 and/or the second delimitation circle 27 has/have a maximum extent which is/are smaller than a maximum extent of a clearance of the tool device 11 which in a state of the tool device 11 disposed on the tool receptacle device 213 interacts with at least one entrainment jaw 216a, 216b and/or at least in part receives the latter. The clamping wing 19 along the first delimitation circle 23 and/or the second delimitation circle 27 preferably has a maximum extent which is smaller than a minimum spacing between the output edge 219a of the torque-transmitting region 219 and of the assembly coding element 300, 302, 308, 310 of the tool device 11. Four potential embodiments of a clamping wing 19 having a smaller maximum extent are illustrated in an exemplary manner in FIG. 14c.

Figure 14D:
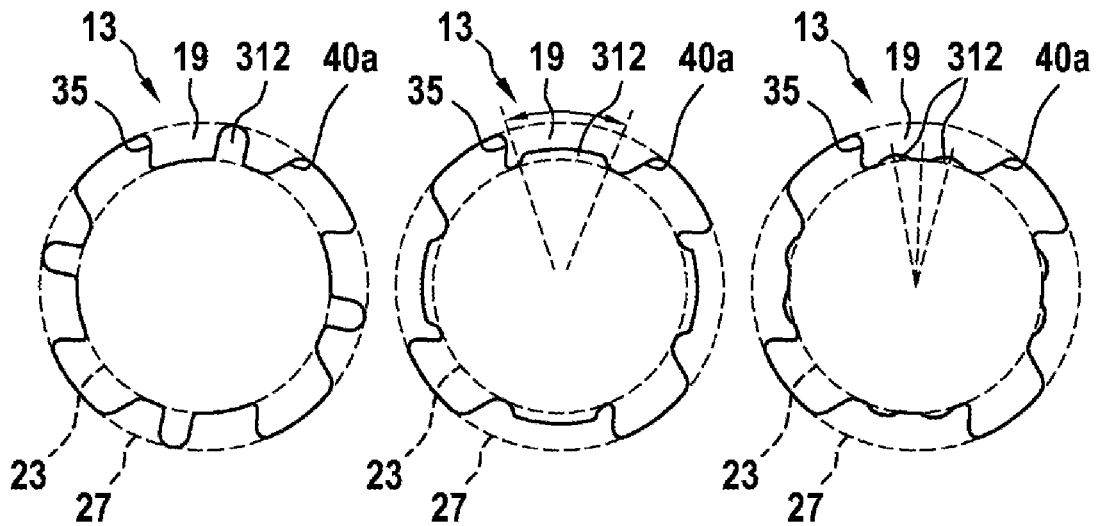

The connector device 13 in FIG. 14d preferably has at least one clamping wing 19, in particular at least four clamping wings 19, on which at least one tool assembly coding element 304, 306, 312, 314 of the tool device 11 is disposed. The tool assembly coding element 304, 306, 312, 314 that is disposed on the clamping wing 19 in the left image of FIG. 14d has a maximum radial extent which is smaller than or equal to a maximum radial spacing between the first delimitation circle 23 and the second delimitation circle 27.

The tool assembly coding element 304, 306, 312, 314 that is disposed on the clamping wing 19 in the central image of FIG. 14d has a maximum circumferential extent which along an angular range having a value from a value range from 10° to 40° extends.

The tool assembly coding element 304, 306, 312, 314 that is disposed on the clamping wing 19 in the right image of FIG. 14d has a maximum circumferential extent which is smaller than or equal to 17 mm and is preferably disposed within an angular range having a value from a value range from 10° to 40° between at least two clearances of the tool device 11 that interact with an entrainment jaw 216a, 216b and/or at least in part receives the latter.

Figure 14E:
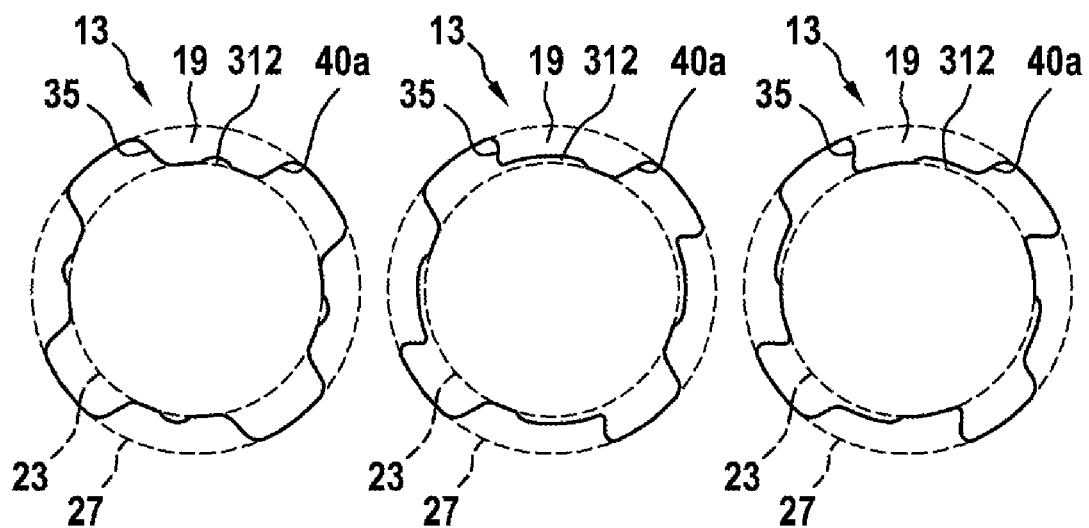

The connector device 13 in FIG. 14e preferably has at least one clamping wing 19, in particular at least four clamping wings 19, on which at least one tool assembly coding element 304, 306, 312, 314 of the tool device 11 is disposed. The clamping wing(s) 19 in the left image of FIG. 14e is/are configured so as to be mirror-symmetrical in relation to a plane of symmetry that comprises the tool rotation axis a. The tool assembly coding elements 304, 306, 312, 314 preferably on both sides are contiguous to an edge which delimits the clamping wing 19 and which preferably runs at least in part along the first delimitation circle 23.

The clamping wings 19 in the central image of FIG. 14e is/are configured so as to be non-symmetrical in relation to a plane of symmetry that comprises the tool rotation axis a. The tool assembly coding elements 304, 306, 312, 314 on one side, in particular on a side that faces the drive edge 40a, of the tool assembly coding elements 304, 306, 312, 314 are preferably contiguous at least to one edge which delimits the clamping wing 19 and which preferably runs at least in part along the first delimitation circle 23. The tool assembly coding elements 304, 306, 312, 314 on a side of the respective tool assembly coding element 304, 306, 312, 314 that faces the coding edge 35 are preferably contiguous at least to one further edge which delimits the clamping wing 19 and which relative to the first delimitation circle 23 is disposed so as to be offset in the direction of the second delimitation circle 27.

The clamping wing(s) 19 in the right image of FIG. 14e is/are configured so as to be non-symmetrical in relation to a plane of symmetry that comprises the tool rotation axis a. The tool assembly coding elements 304, 306, 312, 314 on one side, in particular on a side that faces the coding edge 35, of the tool assembly coding elements 304, 306, 312, 314 are preferably contiguous at least to one edge which delimits the clamping wing 19 and which preferably runs at least in part along the first delimitation circle 23. The tool assembly coding elements 304, 306, 312, 314 on a side of the respective tool assembly coding element 304, 306, 312, 314 that faces the drive edge 40a are preferably contiguous at least to one further edge which delimits the clamping wing 19 and which relative to the first delimitation circle 23 is disposed so as to be offset in the direction of the second delimitation circle 27.

Figure 16A:
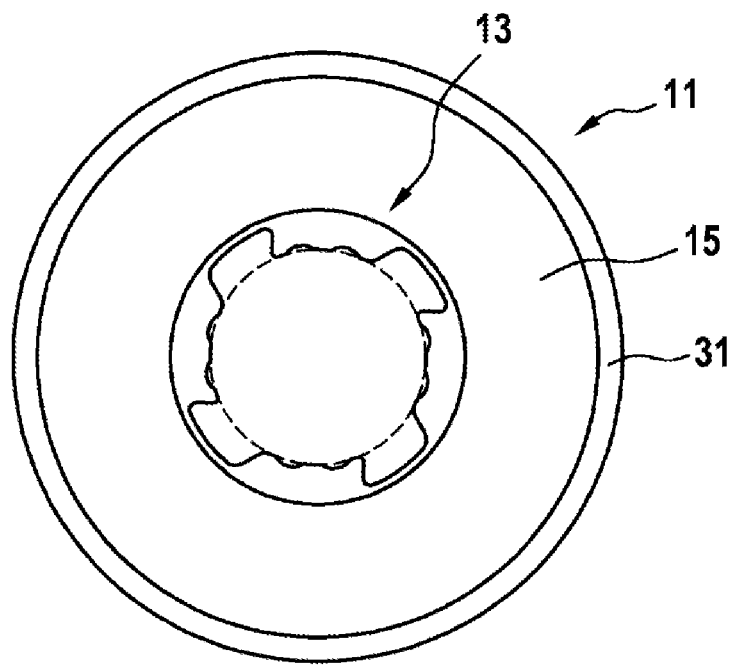
FIG. 16a shows a plan view of a design embodiment of a tool device as a core drill bit.
Figure 16B:
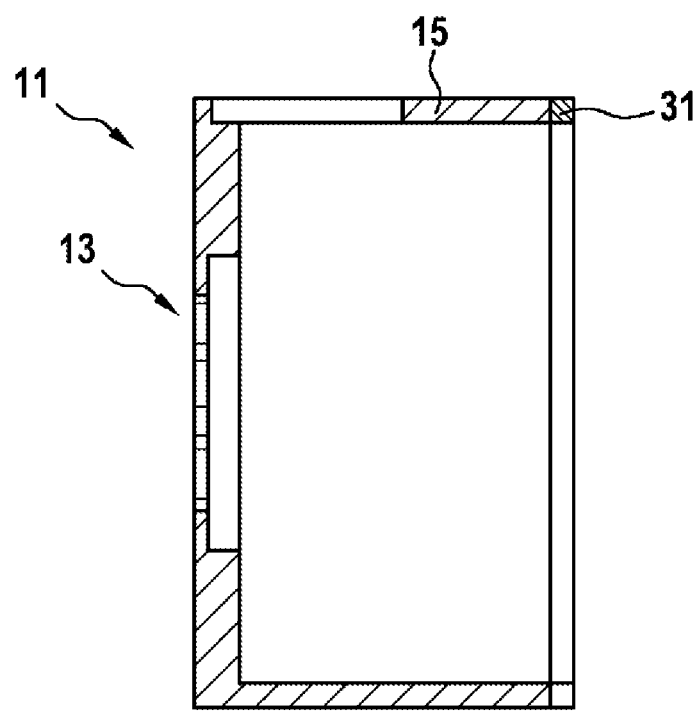

FIGS. 16a, 16b, 17a, 17b, 18a and 18b show potential embodiments of the tool device 11. A potential embodiment of the tool device 11 as a core drill bit is illustrated in FIGS. 16a and 16b. The tool device 11 comprises the connector device 13 and the operating region 15 that is contiguous to the connector device 13. The operating region 15 is configured so as to be cylindrical, in particular circular-cylindrical. The operating region 15 preferably has an at least substantially consistent maximum diameter, in particular when viewed along the tool rotation axis a. The operating region 15 along the tool rotation axis a preferably has a constant maximum spacing in relation to the tool rotation axis a. The operating region on a side of the operating region 15 that faces away from the connector device 13 comprises at least one separation segment 31 or a plurality of separation segments 31. The separation segment(s) 31 is/are preferably configured as (a) diamond separation segment(s). However, it is also conceivable for the separation segment(s) 31 to have another design embodiment that is considered expedient by a person skilled in the art, such as, for example, a design embodiment as hard-metal separation segments or the like.

Figure 17A:
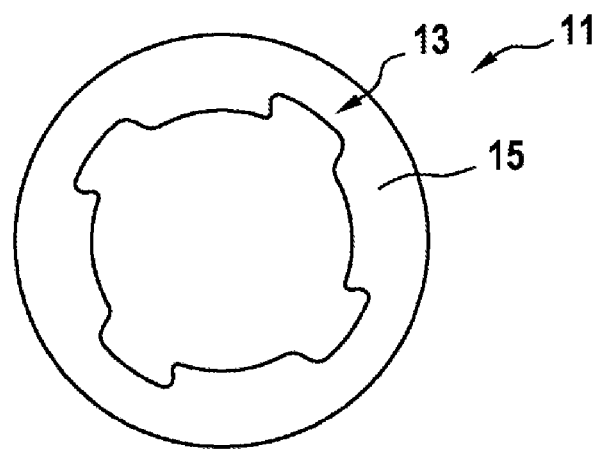
FIG. 17a shows a plan view of a design embodiment of a tool device as a core drill bit, as an alternative to FIGS. 15a and 15b.
Figure 17B:
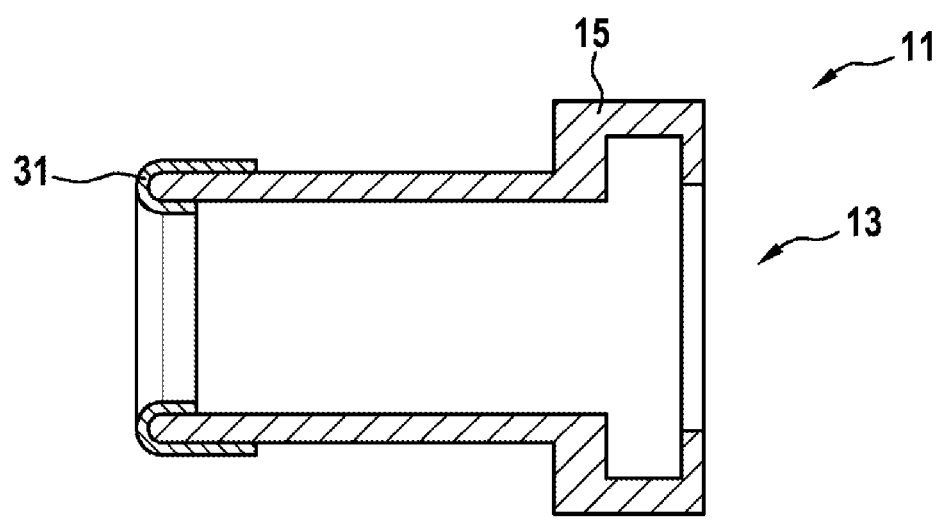

A potential embodiment of the tool device 11 as a core drill bit is illustrated in FIGS. 17a and 17b. The tool device 11 illustrated in FIGS. 17a and 17b has a design embodiment that is at least substantially analogous to that of the tool device 11 illustrated in FIGS. 16a and 16b. By contrast to the tool device 11 illustrated in FIGS. 16a and 16b, the tool device 11 illustrated in FIGS. 17a and 17b has an operating region 15 which, in particular when viewed along the tool rotation axis a, has an at least two dissimilar maximum diameter. The operating region 15 in a region assigned to the separation segment 31 preferably has a smaller maximum diameter than in a region assigned to the connector device 13. A diameter change or a diameter variation can be configured so as to be abrupt or configured so as to be continuous. The separation segment 31 is preferably configured as a coating which comprises separation particles, in particular diamond particles, corundum particles, or the like. However, it is also conceivable for the separation segment 31 to be configured as a hard-metal separation segment or the like.

Figure 18A:
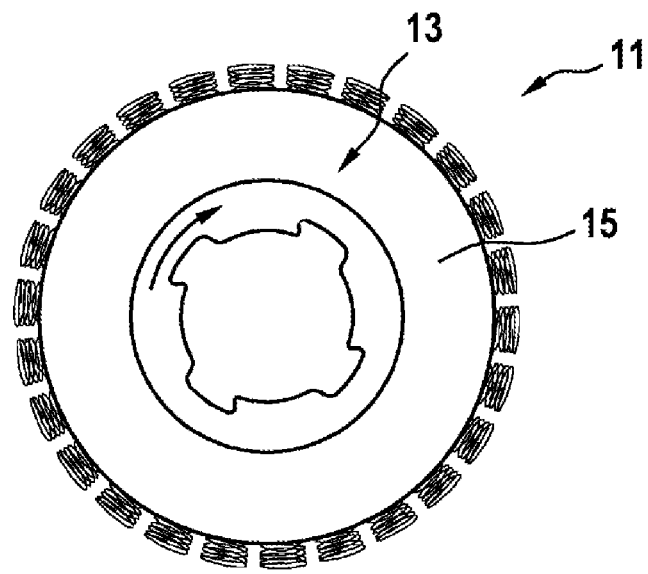
FIG. 18a shows a plan view of a design embodiment of a tool device as a wire brush, as an alternative to FIGS. 15a and 15b.
Figure 18B:
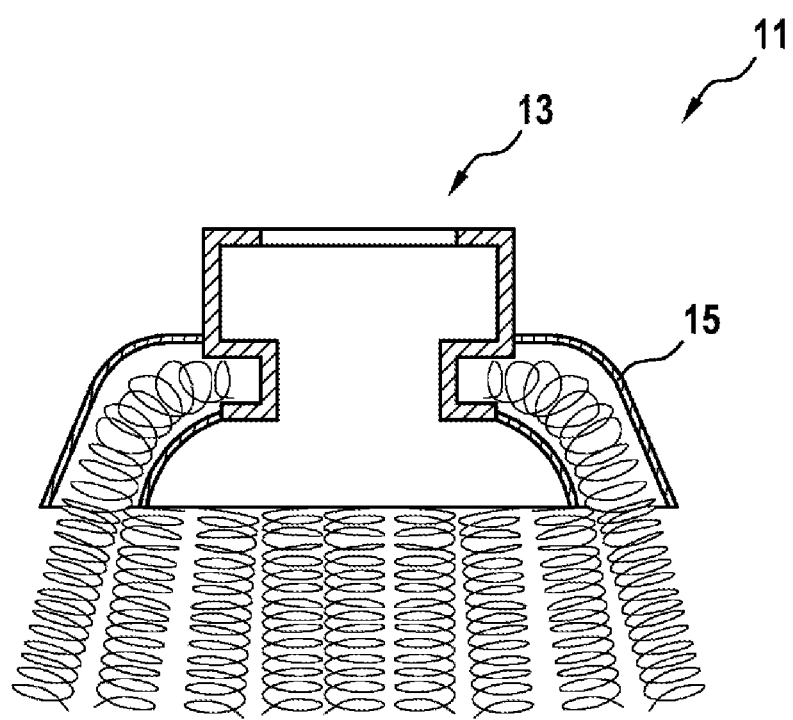

A potential embodiment of the tool device 11 as a pot-shaped brush is illustrated in FIGS. 18a and 18b. The tool device 11 preferably comprises the connector device 13 and an operating region 15 disposed thereon. The operating region 15 is configured so as to be pot-shaped. The operating region 15 preferably comprises a fixing region to which bristle-type workpiece-machining elements of the tool device 11 are fixed. The workpiece-machining elements can be configured as coated nylon bristles, as coated metal bristles, as metal bristles, or the like. The workpiece-machining elements can be configured so as to be crimped or non-crimped. The workpiece-machining elements are preferably fixed to the fixing region by means of a force-fitting, form-fitting and/or materially integral connection.

The invention claimed is:

1. A tool device for machining a workpiece, comprising: a connector device defining a clearance and configured to be releasably connected to a tool receptacle device of a hand-held power tool such that an output axis of an output shaft of the hand-held power tool and a tool rotation axis of the tool device substantially coincide, the connector device comprising: a plurality of clamping wings extending radially inwardly at least substantially along an orthogonal plane to the tool rotation axis, each clamping wing of the plurality of clamping wings including a first delimitation edge that lies on a first delimitation circle defined around the tool rotation axis and that at least partially defines a radial extent of the clearance, wherein each clamping wing has a drive edge and a coding edge that delimit opposite circumferential ends of the clamping wing, and a distance measured along the first delimitation circle between the drive edge and the coding edge defines a respective circumferential extent of each clamping wing, wherein the clamping wings of each adjacent pair of clamping wings are spaced apart from one another by a circumferential distance defined along the first delimitation circle, and the circumferential distance is less than the respective circumferential extent of each clamping wing of the adjacent pair of clamping wings, wherein the respective circumferential extent of each clamping wing defines an angular extent of less than 900, and wherein each clamping wing is asymmetrical about every plane of symmetry defined by the radial direction and an axial direction of the tool rotation axis.

2. The tool device as claimed in claim 1, wherein the circumferential distance between each adjacent pair of clamping wings is up to 50% less than the circumferential extent of the first delimitation edges of the adjacent pair of clamping wings.

3. The tool device as claimed in claim 1, wherein the clearance is further defined by a plurality of second delimitation edges, which extend circumferentially between adjacent clamping wings along a second delimitation circle that has a greater diameter than the first delimitation circle.

4. The tool device as claimed in claim 3, wherein a first diameter of the first delimitation circle is between 50% and 95% of a second diameter of the second delimitation circle.

5. The tool device as claimed in claim 3, wherein each clamping wing includes a torque-receiving region between the first delimitation edge and an adjacent one of the plurality of second delimitation edges, the torque-receiving region including the drive edge and/or a drive face configured to receive torque applied in the circumferential direction.

6. The tool device as claimed in claim 5, wherein each torque-receiving region is angled relative to a radial direction counter to a rotation direction of the tool receptacle device in the operation of the hand-held power tool such that an inner radial end of the drive edge and/or drive face is arranged circumferentially beyond an outer radial end of the drive edge and/or drive face in the rotation direction.

7. The tool device as claimed in claim 6, wherein the torque-receiving region is angled by up to 30° in the circumferential direction about the tool rotation axis relative to a plane that is defined by an axial direction and the radial direction of the tool rotation axis.

8. The tool device as claimed in claim 6, wherein each torque-receiving region is defined at least in portions by at least one of an axial and a radial extent of the associated clamping wing.

9. The tool device as claimed in claim 3, wherein:
the connector device further comprises at least one tool assembly coding element configured, when the tool device is mounted on the tool receptacle device, to interact with at least one assembly coding element of the tool receptacle device, and the at least one tool assembly coding element is delimited by and extends radially outwardly from the first delimitation circle, and
each of the at least one tool assembly coding elements has a maximum radial extent which is less than or equal to a maximum radial spacing between the first delimitation circle and the second delimitation circle.

10. The tool device as claimed in claim 1, wherein the at least one tool assembly coding element is defined in each clamping wing of the plurality of clamping wings as a recess that extends completely through a maximum axial material thickness of the clamping wing.

11. The tool device as claimed in claim 1, wherein the connector device further comprises a disk-shaped or angulated support flange.

12. The tool device as claimed in claim 11, further comprising:
an operating region connected to the support flange and completely surrounding the support flange, the operating region configured to operate on a workpiece or a workpiece assembly,
wherein the operating region is disposed on the support flange in such a manner that the operating region projects in an axial direction from the support flange toward the tool receptacle device of the hand-held power tool.

13. The tool device as claimed in claim 12, wherein the support flange has a support lip extending radially and overlapping the operating region on a side of the operating region configured for operating on the workpiece such that, in the event of a broken connection between the support flange and the operating region, the operating region is held between the support flange and the power tool by the support lip.

14. The tool device as claimed in claim 1, wherein the clearance is configured as a material cut-out that extends through the entire material thickness of the tool device and completely encompasses the output shaft of the hand-held power tool.

15. The tool device as claimed in claim 1, wherein the plurality of clamping wings includes an even plurality of clamping wings arranged symmetrically about the tool rotation axis.

16. The tool device as claimed in claim 1, wherein the plurality of clamping wings includes exactly four clamping wings.

17. The tool device as claimed in claim 1, wherein the connector device further comprises at least one tool assembly coding element configured, when the tool device is mounted on the tool receptacle device, to interact with at least one assembly coding element of the tool receptacle device, and the at least one tool assembly coding element is delimited by and extends radially outwardly from the first delimitation circle.

18. The tool device as claimed in claim 17, wherein:
(i) each of the at least one tool assembly coding elements is defined in an associated clamping wing of the plurality of clamping wings, and is circumferentially spaced apart from the drive edge and the coding edge of the associated clamping wing or (ii) each of the at least one tool assembly coding elements is defined in an associated clamping wing of the plurality of clamping wings, and extends circumferentially from the drive edge or the coding edge, and
each of the at least one tool assembly coding elements has a maximum angular range of from 10° to 40°.

19. A tool device for machining a workpiece, comprising:
a connector device defining a clearance and configured to be releasably connected to a tool receptacle device of a hand-held power tool such that an output axis of an output shaft of the hand-held power tool and a tool rotation axis of the tool device substantially coincide, the connector device comprising:
a plurality of clamping wings extending radially inwardly at least substantially along an orthogonal plane to the tool rotation axis, each clamping wing of the plurality of clamping wings including a first delimitation edge that lies on a first delimitation circle defined around the tool rotation axis and that at least partially defines a radial extent of the clearance,
wherein each clamping wing is configured as a spring wing that is elastically flexural in an axial direction.

20. The tool device as claimed in claim 19, wherein a circumferential distance along the first delimitation circle between each adjacent pair of clamping wings is less than a circumferential extent of the first delimitation edges of the adjacent pair of clamping wings.

21. The tool device as claimed in claim 19, wherein each clamping wing is asymmetrical about every plane of symmetry defined by the radial direction and an axial direction of the tool rotation axis.

22. The tool device as claimed in claim 19, wherein the connector device further comprises at least one tool assembly coding element configured, when the tool device is mounted on the tool receptacle device, to interact with at least one assembly coding element of the tool receptacle device, and the at least one tool assembly coding element is delimited by and extends radially outwardly from the first delimitation circle.

23. The tool device as claimed in claim 19, wherein each clamping wing has a maximum benchmark that corresponds to a spring rate of between 10,000 N/mm and 350,000 N/mm.

24. A power tool system comprising:
at least one hand-held power tool having a tool receptacle device and an output shaft with defining output axis; and
a tool device comprising:
a connector device defining a clearance and configured to be releasably connected to the tool receptacle device such that the output axis of the output shaft and a tool rotation axis of the tool device substantially coincide, the connector device comprising,
a plurality of clamping wings extending radially inwardly at least substantially along an orthogonal plane to the tool rotation axis, each clamping wing of the plurality of clamping wings including a first delimitation edge that lies on a first delimitation circle defined around the tool rotation axis and that at least partially defines a radial extent of the clearance,
wherein each clamping wing has a drive edge and a coding edge that delimit opposite circumferential ends of the clamping wing, and a distance measured along the first delimitation circle between the drive edge and the coding edge defines a respective circumferential extent of each clamping wing,
wherein the clamping wings of each adjacent pair of clamping wings are spaced apart from one another by a circumferential distance defined along the first delimitation circle, and the circumferential distance is less than the respective circumferential extent of each clamping wing of the adjacent pair of clamping wings, and
wherein the respective circumferential extent of each clamping wing defines an angular extent of less than 90°, and
wherein each clamping wing is asymmetrical about every plane of symmetry defined by the radial direction and an axial direction of the tool rotation axis.

* * * * *

UNITED STATES PATENT AND TRADEMARK OFFICE
CERTIFICATE OF CORRECTION

| | | |
|---|---|---|
| PATENT NO. | : 11,969,911 B2 | Page 1 of 1 |
| APPLICATION NO. | : 17/173768 | |
| DATED | : April 30, 2024 | |
| INVENTOR(S) | : Fellmann et al. | |

It is certified that error appears in the above-identified patent and that said Letters Patent is hereby corrected as shown below:

In the Claims

In Claim 1, at Column 37, Line 59: "less than 900" should read --less than 90°--.

Signed and Sealed this
Eleventh Day of June, 2024

Katherine Kelly Vidal
*Director of the United States Patent and Trademark Office*